United States Patent
Ahn et al.

(10) Patent No.: US 8,625,509 B2
(45) Date of Patent: Jan. 7, 2014

(54) METHOD OF TRANSMITTING SIGNAL IN WIRELESS COMMUNICATION SYSTEM AND APPARATUS THEREOF

(75) Inventors: Joon Kui Ahn, Anyang-si (KR); Jung Hoon Lee, Anyang-si (KR); Dong Youn Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 437 days.

(21) Appl. No.: 12/996,343

(22) PCT Filed: Dec. 23, 2009

(86) PCT No.: PCT/KR2009/006149
§ 371 (c)(1),
(2), (4) Date: Dec. 3, 2010

(87) PCT Pub. No.: WO2010/050704
PCT Pub. Date: May 6, 2010

(65) Prior Publication Data
US 2011/0096745 A1    Apr. 28, 2011

Related U.S. Application Data

(60) Provisional application No. 61/118,648, filed on Nov. 30, 2008, provisional application No. 61/109,914, filed on Oct. 30, 2008.

(30) Foreign Application Priority Data

Oct. 8, 2009    (KR) .................. 10-2009-0095633

(51) Int. Cl.
*H04W 72/04*    (2009.01)
*H04B 7/208*    (2006.01)
*H04B 1/69*    (2011.01)

(52) U.S. Cl.
USPC ........... 370/329; 370/330; 370/343; 370/344; 370/208; 455/450; 455/451.2; 375/130; 375/267; 375/295

(58) Field of Classification Search
USPC ................. 370/328, 329, 335–337, 342–343, 370/344–345; 455/450, 452.2
See application file for complete search history.

(56) References Cited

U.S. PATENT DOCUMENTS

| | | | |
|---|---|---|---|
| 7,653,140 B2 * | 1/2010 | Pajukoski et al. | 375/260 |
| 8,379,738 B2 * | 2/2013 | Pi et al. | 375/260 |
| 2004/0085919 A1 | 5/2004 | Song et al. | |
| 2007/0036068 A1 | 2/2007 | Cho et al. | |
| 2008/0293424 A1 * | 11/2008 | Cho et al. | 455/450 |
| 2008/0311942 A1 * | 12/2008 | Kim et al. | 455/509 |
| 2009/0147743 A1 * | 6/2009 | Parkvall et al. | 370/329 |
| 2009/0161618 A1 * | 6/2009 | Johansson et al. | 370/329 |
| 2009/0201902 A1 * | 8/2009 | Miki et al. | 370/342 |
| 2010/0039997 A1 * | 2/2010 | Ratasuk et al. | 370/329 |
| 2010/0048219 A1 * | 2/2010 | Fukuoka et al. | 455/450 |
| 2010/0061359 A1 * | 3/2010 | Fukuoka et al. | 370/342 |
| 2010/0195583 A1 * | 8/2010 | Nory et al. | 370/329 |
| 2010/0260116 A1 * | 10/2010 | Imamura et al. | 370/329 |
| 2010/0279628 A1 * | 11/2010 | Love et al. | 455/70 |

\* cited by examiner

*Primary Examiner* — Candal Elpenord

(74) *Attorney, Agent, or Firm* — McKenna Long & Aldridge LLP

(57) ABSTRACT

A method of, at a base station, transmitting spread signals in a wireless communication system includes spreading a plurality of signals using a spreading code with a predetermined spreading factor, multiplexing a plurality of spread signals to construct one or more spread signal groups, mapping the one or more spread signal groups to one or more specific Control Channel Elements (CCEs) set within one or more Orthogonal Frequency Division Multiplexing (OFDM) symbols, and transmitting the spread signals to User Equipments (UEs) through the one or more CCEs.

20 Claims, 24 Drawing Sheets

FIG. 2
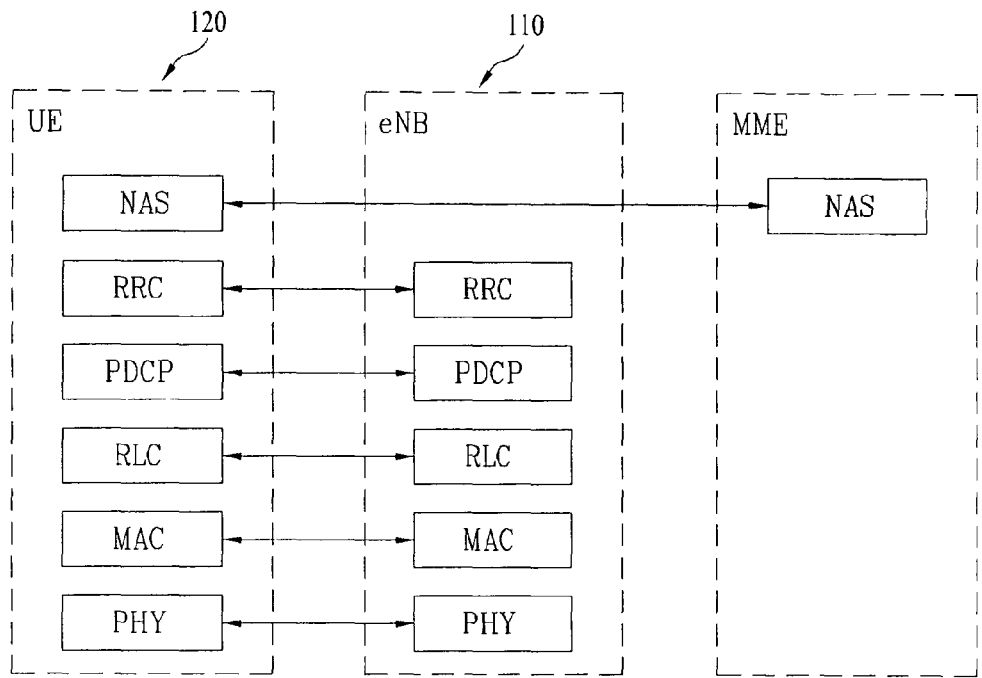
(a) Control-plane protocol stack
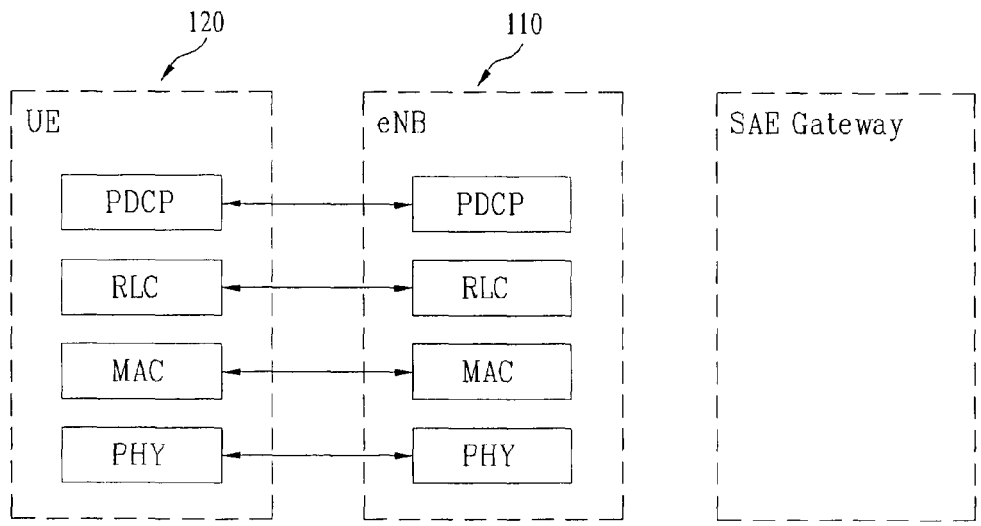
(b) User-plane protocol stack FIG. 7
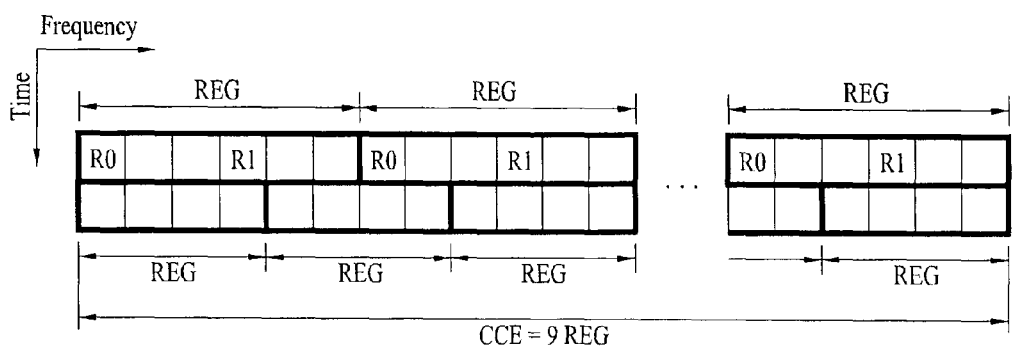
(a) 1 or 2 TX case
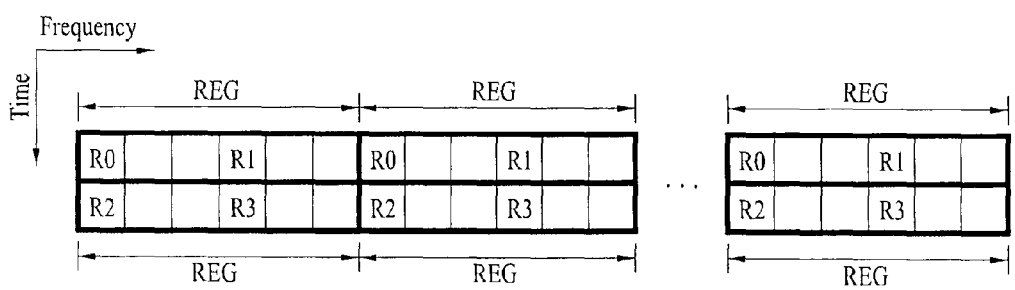
(b) 4 TX case Single component carrier

FIG. 9
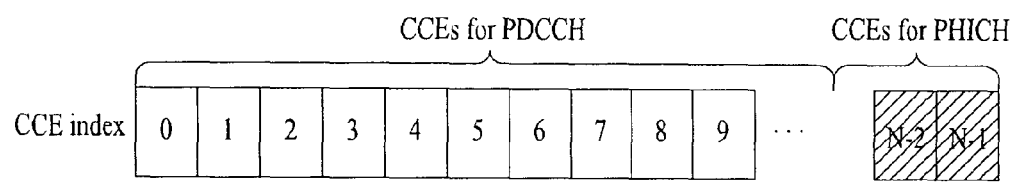
(a) Consecutive PHICH CCEs
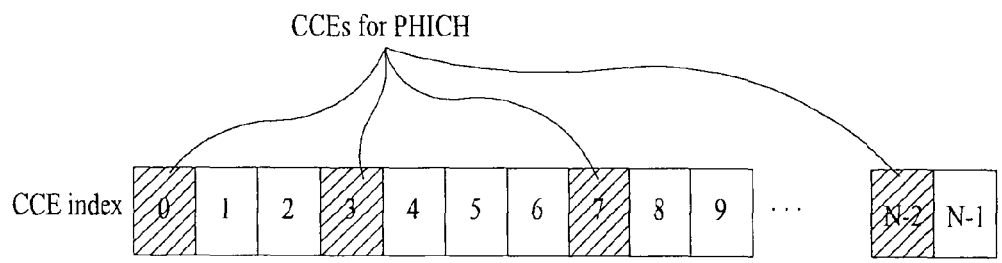
(b) Distributed PHICH CCEs
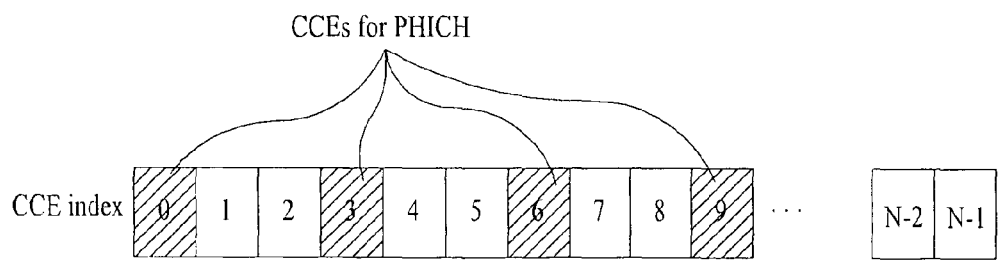
(c) PHICH CCEs with a pattern PUCCH format 1a and 1b structure (normal CP case)

Single component carrier

METHOD OF TRANSMITTING SIGNAL IN WIRELESS COMMUNICATION SYSTEM AND APPARATUS THEREOF

This application claims the benefit of U.S. Provisional Application No. 61/109,914 filed on Oct. 30, 2008, U.S. Provisional Application No. 61/118,648 filed on Nov. 30, 2008, Korean Patent Application No. 10-2009-0095633 filed on Oct. 8, 2009 and PCT Application No. PCT/KR2009/006149 filed Oct. 23, 2009, all of which are incorporated by reference in their entirety herein.

TECHNICAL FIELD

The present invention relates to a wireless communication system, and more particularly, to a method of transmitting a signal in a wireless communication system using a plurality of frequency blocks and an apparatus thereof. The wireless communication system can support at least one of Single-Carrier-Frequency Division Multiple Access (SC-FDMA), Multi-Carrier-Frequency Division Multiple Access (MC-FDMA) and Orthogonal Frequency Division Multiple Access (OFDMA). The wireless communication system can support at least one of Frequency Division Duplex (FDD), Half-FDD (H-FDD) and Time Division Duplex (TDD).

BACKGROUND ART

FIG. 1 is a diagram showing a network architecture of an Evolved Universal Mobile Telecommunications System (E-UMTS). The E-UMTS is an evolved form of the Wideband Code Division Multiple Access (WCDMA) UMTS and has been standardized in the $3^{rd}$ Generation Partnership Project (3GPP). Generally, the E-UMTS may be called a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS mainly includes a User Equipment (UE) 120, base stations (or eNBs or eNode Bs) 110a and 110b, and an Access Gateway (AG) which is located at an end of a network (E-UTRAN) and which is connected to an external network. Generally, an eNB can simultaneously transmit multiple data streams for a broadcast service, a multicast service and/or a unicast service. One or more cells may exist per eNB. The cell is set to use a bandwidth such as 1.25, 2.5, 5, 10, 15 or 20 MHz to provide a downlink or uplink transmission service to UEs. Different cells may be set to provide different bandwidths. The eNB controls data transmission or reception of a plurality of UEs. The eNB transmits downlink (DL) scheduling information with respect to DL data so as to inform a corresponding UE of time/frequency region for data, coding scheme, data size, and Hybrid Automatic Repeat and reQest (HARQ)-related information. In addition, the eNB transmits uplink (UL) scheduling information with respect to UL data to a corresponding UE so as to inform the UE of an available time/frequency domain, coding, data size and HARQ-related information. An interface for transmitting user traffic or control traffic can be used between eNBs. A Core Network (CN) may include the AG and a network node or the like for user registration of the UE. The AG manages mobility of a UE on a Tracking Area (TA) basis. One TA includes a plurality of cells.

DISCLOSURE

Technical Problem

Although wireless communication technology has been developed up to Long Term Evolution (LTE) based on Wideband Code Division Multiple Access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

The standardization of the subsequent technology of the LTE is ongoing in the 3GPP. In the present specification, the above-described technology is called "LTE-Advanced" or "LTE-A". The LTE system and the LTE-A system are different from each other in terms of system bandwidth. The LTE-A system aims to support a wideband of a maximum of 100 MHz. The LTE-A system uses carrier aggregation or bandwidth aggregation technology which achieves the wideband using a plurality of frequency blocks. The carrier aggregation enables the plurality of frequency blocks to be used as one large logical frequency band in order to use a wider frequency band. The bandwidth of each of the frequency blocks may be defined based on the bandwidth of a system block used in the LTE system. Each frequency block is transmitted using a component carrier. In the present specification, the component carrier may indicate a frequency block for carrier aggregation or a center carrier of a frequency block according to context, and the frequency block for carrier aggregation and the central carrier of the frequency block may be used together.

An object of the present invention devised to solve the above problem lies in a method of efficiently transmitting or receiving a signal in a wireless communication system and an apparatus thereof.

Another object of the present invention devised to solve the problem lies in a method of efficiently transmitting or receiving a signal in a wireless communication system using a plurality of frequency blocks and an apparatus thereof.

A further object of the present invention devised to solve the problem lies in a method of efficiently transmitting or receiving a signal in a wireless communication system with asymmetric uplink and downlink bandwidths and an apparatus thereof.

Technical Solution

The object of the present invention can be achieved by providing a method of, at a base station, transmitting spread signals in a wireless communication system, the method including: spreading a plurality of signals using a spreading code with a predetermined spreading factor; multiplexing a plurality of spread signals to construct one or more spread signal groups; mapping the one or more spread signal groups to one or more specific Control Channel Elements (CCEs), the one or more specific CCEs being set within one or more Orthogonal Frequency Division Multiplexing (OFDM) symbols; and transmitting the spread signals to one or more User Equipments (UEs) through the one or more specific CCEs.

The method may further include signaling information for identifying the specific CCEs to the one or more UEs. The information for identifying the specific CCEs may include at least one of information on the number of the specific CCEs and information on the location of the specific CCEs.

The information on the number of specific CCEs may be implicitly signaled using at least one of bandwidths of component carriers and a combination of component carriers. The information on the number of specific CCEs may be set on cell-specific basis and be broadcast through a Broadcast Channel (BCH). The information on the number of specific CCEs may be set on UE-specific basis and be signaled using a Radio Resource Control (RRC) message.

In another aspect of the present invention, provided herein is a method of, at a User Equipment (UE), processing spread signals in a wireless communication system, the method including: receiving a plurality of Control Channel Elements (CCEs) through one or more Orthogonal Frequency Division Multiplexing (OFDM) symbols; identifying one or more specific CCEs, to which one or more spread signal groups are mapped, from the plurality of CCEs; reading a spread signal group associated with the UE from the one or more specific CCEs; and demultiplexing the read spread signal group to extract a spread signal designated to the UE.

The method may further include obtaining information for identifying the specific CCEs from the base station. The information for identifying the specific CCEs may include at least one of information on the number of the specific CCEs and information on the location of the specific CCEs.

The information on the number of specific CCEs may be implicitly obtained using at least one of bandwidths of component carriers and a combination of component carriers. The information on the number of specific CCEs may be set on cell-specific basis and be obtained from system information through a Broadcast Channel (BCH). The information on the number of specific CCEs may be set on UE-specific basis and be obtained using a Radio Resource Control (RRC) message.

In another aspect of the present invention, provided herein is a method of, at a User Equipment (UE), transmitting a signal through one uplink component carrier mapped to a plurality of downlink component carriers in a wireless communication system, the method including: receiving data from a base station through the plurality of downlink component carriers; mapping a resource index associated with the data to an uplink resource index, according to an index mapping method, the uplink resource index being used for transmitting an Acknowledgement (ACK)/Negative ACK (NACK) signal to the data; and transmitting the ACK/NACK signal to the data to the base station using an uplink resource indicated by the uplink resource index, wherein the index mapping method is configured so that sets of uplink resource indexes are not overlapped each other at least in part, each set of uplink resource indexes being mapped to resource indexes of each downlink component carrier.

In another aspect of the present invention, provided herein is a user equipment (UE) configured to transmit a signal through one uplink component carrier mapped to a plurality of downlink component carriers in a wireless communication system, the UE including: a Radio Frequency (RF) module configured to receive data from a base station through the plurality of downlink component carriers and to transmit an Acknowledgement (ACK)/Negative ACK (NACK) signal to the data to the base station using an uplink resource indicated by an uplink resource index; and a processor configured to map a resource index associated with the data to an uplink resource index according to an index mapping method, the uplink resource index being used for transmitting the ACK/NACK signal, wherein the index mapping method is configured so that sets of uplink resource indexes are not overlapped each other at least in part, each set of uplink resource indexes being mapped to resource indexes of each downlink component carrier.

The resource indexes associated with the data may include a Control Channel Element (CCE) index. In this case, the index mapping method may include integrating CCE indexes of the different downlink component carriers to configure new CCE indexes.

The index mapping method may independently apply an offset of 0 or more to the resource indexes of the downlink component carriers. In this case, the offset may independently be applied on cell-specific or UE-specific basis.

The method may further include obtaining information on the offset from the base station. The user equipment may further obtain information on the offset from the base station. In this case, the information on the offset may be implicitly obtained using at least one of the bandwidths of component carriers and a combination of component carriers. The information on the offset may be obtained from system information through a Broadcast Channel (BCH) or a Radio Resource Control (RRC) message.

Advantageous Effects

The embodiments of the present invention have the following effects.

First, it is possible to provide a method of efficiently transmitting or receiving a signal in a wireless communication system and an apparatus thereof.

Second, it is possible to provide a method of efficiently transmitting or receiving a signal in a wireless communication system using a plurality of frequency blocks and an apparatus thereof.

Third, it is possible to provide a method of efficiently transmitting or receiving a signal in a wireless communication system with asymmetric uplink and downlink bandwidths and an apparatus thereof.

DESCRIPTION OF DRAWINGS

The accompanying drawings, which are included to provide a further understanding of the invention, illustrate embodiments of the invention and together with the description serve to explain the principle of the invention.

In the drawings:

FIG. 2 is a diagram showing a radio interface protocol architecture between a User Equipment (UE) and an Evolved Universal Terrestrial Radio Access Network (E-UTRAN) based on a $3^{rd}$ Generation Partnership Project (3GPP) radio access network standard.

FIG. 7 is a diagram showing a resource unit used for configuring a control channel.

FIG. 9 is a diagram showing a method of additionally securing a PHICH group using a Control Channel Element (CCE) according to an embodiment of the present invention.

BEST MODE

Figure 1:
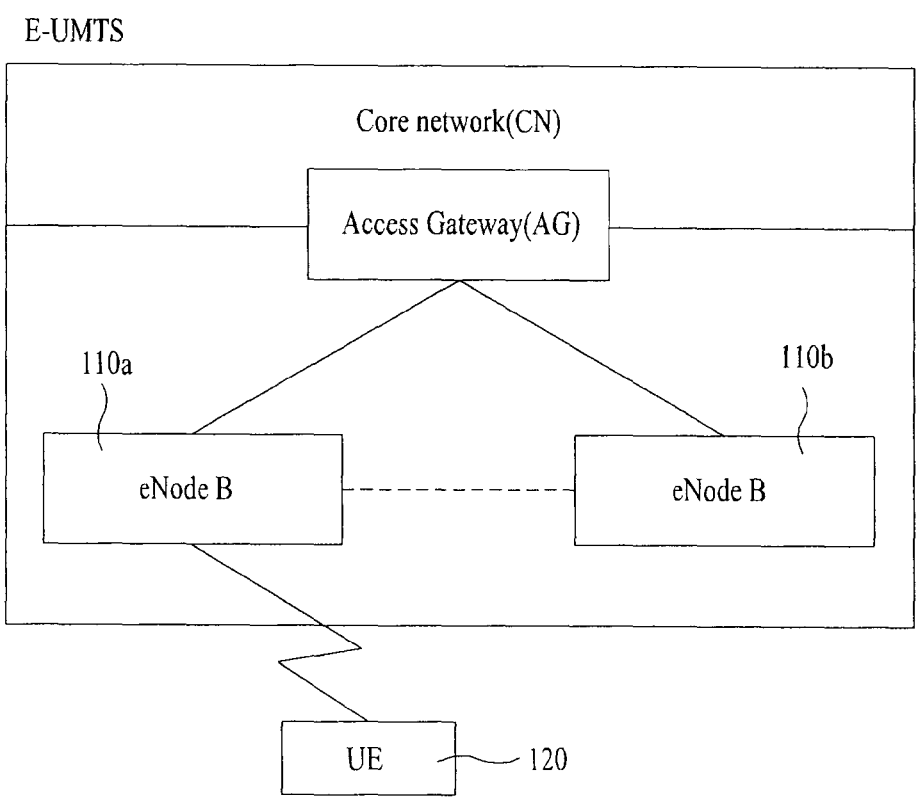
FIG. 1 is a diagram showing a network architecture of an Evolved Universal Mobile Telecommunications System (E-UMTS).

The configuration, operation and other features of the present invention will be understood by the embodiments of the present invention described with reference to the accompanying drawings. The following embodiments are examples of applying the technical features of the present invention to a 3$^{rd}$ Generation Partnership Project (3GPP) system.

Hereinafter, a system using a single frequency block as a system band is called a legacy system or a narrowband system. Meanwhile, a system including a plurality of frequency blocks in its system band and using one or more frequency blocks as a system block of a legacy system is called an evolved system or a wideband system. The frequency block used as the block of the legacy system has the same size as the system block of the legacy system. In contrast, the sizes of residual frequency blocks are not specially limited. However, for system simplicity, the sizes of the residual frequency blocks may be determined based on the size of the system block of the legacy system. For example, a 3GPP LTE (Release-8) system and a 3GPP LTE-A (Release-9) system are in relationship of a legacy system and an evolved system.

Based on the above definition, in the present specification, the 3GPP LTE (Release-8) system is referred to as an LTE system or a legacy system. In addition, a User Equipment (UE) which supports the LTE system is referred to as an LTE UE or a legacy UE. The 3GPP LTE-A (Release-9) system is referred to as an LTE-A system or an evolved system. In addition, a UE which supports the LTE-A system is referred to as an LTE-A UE or an evolved UE.

Although, for convenience, the embodiments of the present invention are described using the LTE system and the LTE-A system in the present specification, the embodiments of the present invention are applicable to any communication system corresponding to the above definition. In addition, although the embodiments of the present invention are described based on a Frequency Division Duplex (FDD) scheme in the present specification, the embodiments of the present invention may be easily modified and applied to a Half-Duplex FDD (H-FDD) scheme or a Time Division Duplex (TDD) scheme.

FIG. 2 shows a control plane and a user plane of a radio interface protocol between a UE and an Evolved Universal Terrestrial Radio Access Network (E-UTRAN) based on a 3GPP radio access network standard. The control plane refers to a path used for transmitting control messages, which are used for managing a call between the UE and the network. The user plane refers to a path used for transmitting data generated in an application layer, e.g., voice data or Internet packet data.

A physical (PHY) layer of a first layer provides an information transfer service to an upper layer using a physical channel. The PHY layer is connected to a Medium Access Control (MAC) layer on an upper layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. In detail, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of an upper layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 packet or an IPv6 packet in a radio interface having a relatively narrow bandwidth.

A Radio Resource Control (RRC) layer located at the bottom of a third layer is defined only in the control plane and is responsible for control of logical, transport, and physical channels in association with configuration, re-configuration, and release of Radio Bearers (RBs). The RB is a service that the second layer provides for data communication between the UE and the network. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located above the RRC layer performs functions such as session management and mobility management.

One cell of the eNB is set to use a bandwidth such as 1.25, 2.5, 5, 10, 15 or 20 MHz to provide a downlink or uplink transmission service to UEs. Different cells may be set to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. User traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
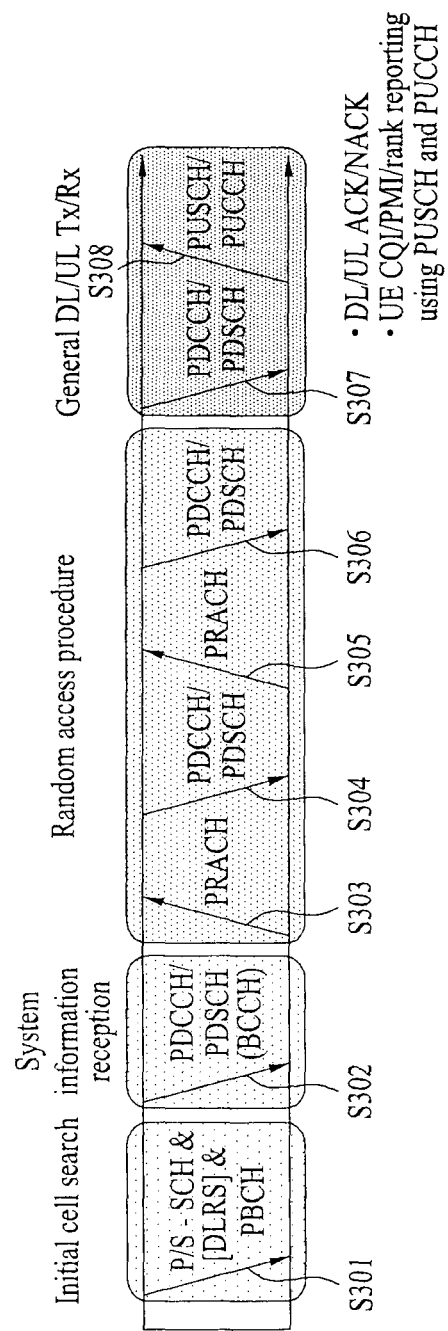
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as synchronization with an eNB when power is turned on or the UE enters a new cell (S301). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE which completes the initial cell search may receive a Physical Downlink Control Channel (PDCCH) and a Physical Downlink Shared Channel (PDSCH) according to information included in the PDCCH so as to acquire more detailed system information (S302).

Meanwhile, if the eNB is initially accessed or radio resources for signal transmission are not present, the UE may perform a Random Access Procedure (RACH) (step S303 to S306) with respect to the eNB. In this case, the UE may transmit a specific sequence through a Physical Random Access Channel (PRACH) as a preamble (S303 and S305), and receive a response message of the preamble through the PDCCH and the PDSCH corresponding thereto (S304 and S306). In the case of contention-based RACH, a contention resolution procedure may be further performed.

The UE which performs the above procedures may perform PDCCH/PDSCH reception (S307) and Physical Uplink Shared Channel (PUSCH)/Physical Uplink Control Channel (PUCCH) transmission (S308) as a general uplink/downlink signal transmission procedure. The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Figure 4:
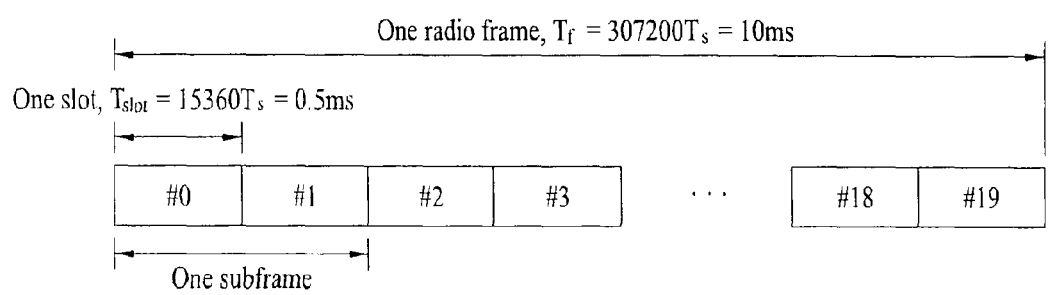
FIG. 4 is a diagram showing the architecture of a radio frame used in Long Term Evolution (LTE).

FIG. 4 is a diagram showing the architecture of a radio frame used in Long Term Evolution (LTE).

Referring to FIG. 4, the radio frame has a length of 10 ms ($327200 \cdot T_s$) and includes 10 subframes with the same size. Each of the subframes has a length of 1 ms and includes two slots. Each of the slots has a length of 0.5 ms ($15360 \cdot T_s$). $T_s$ denotes a sampling time, and is represented by $T_s=1/(15 \text{ kHz} \times 2048)=3.2552 \times 10^{-8}$ (about 33 ns). Each slot includes a plurality of OFDM symbols in a time domain, and includes a plurality of resource blocks (RBs) in a frequency domain. In the LTE system, one RB includes 12 subcarriers×7(6) OFDM symbols. A Transmission Time Interval (TTI) which is a unit time for transmission of data may be determined in units of one or more subframes. The architecture of the radio frame is only exemplary and the number of subframes included in the radio frame, the number of slots included in the subframe, or the number of OFDM symbols included in the slot may be variously changed.

Figure 5:
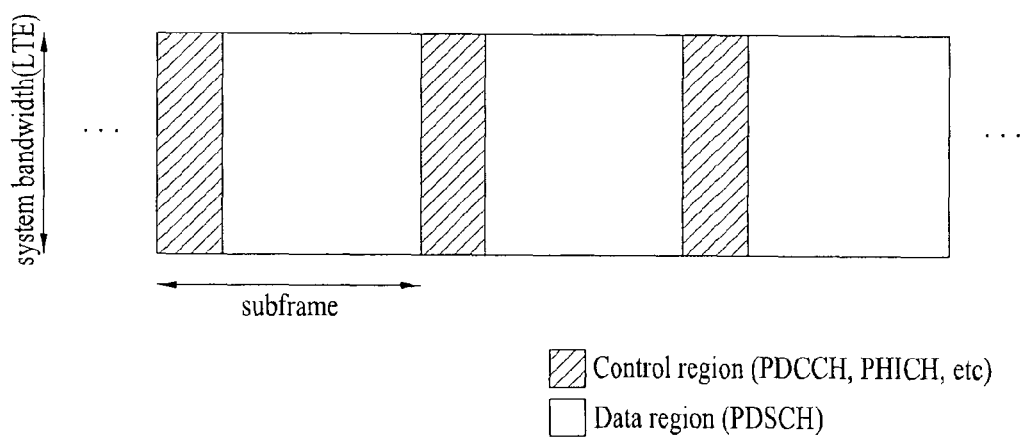
FIG. 5 is a diagram showing the architecture of a downlink radio frame.

FIG. 5 is a diagram showing the architecture of a downlink radio frame.

Referring to FIG. 5, the downlink radio frame includes 10 subframes with the same length. In the 3GPP LTE system, the subframe is defined as the basic time unit of packet scheduling with respect to an overall downlink frequency. Each subframe is divided into a time interval for transmission of scheduling information and other control information (control region) and a time interval for transmission of downlink data (data region). The control region starts from a first OFDM symbol of the subframe and includes one or more OFDM symbols. The size of the control region may be independently set for each subframe. The control region is used to transmit an L1/L2 (layer 1/layer 2) control signal. The data region is used to transmit downlink traffic.

Figure 6:
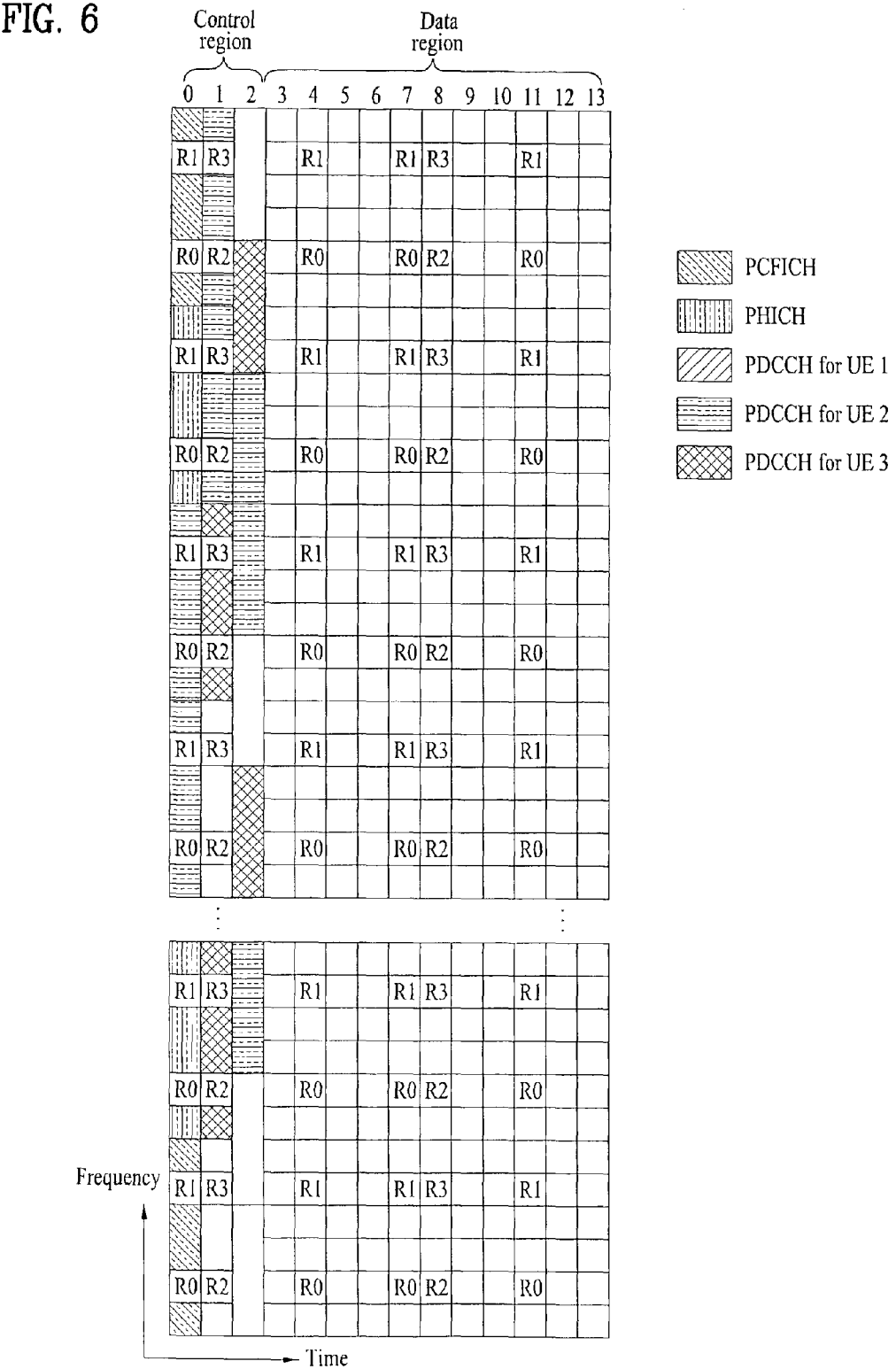
FIG. 6 is a diagram showing a control channel included in a control region of a subframe.

FIG. 6 is a diagram showing a control channel included in the control region of the subframe.

Referring to FIG. 6, the subframe is composed of 14 OFDM symbols. According to the configuration of the subframe, the first one to three OFDM symbols are used as the control region and the remaining 13 to 11 OFDM symbols are used as the data region. In the drawing, R1 to R4 denote Reference Signals (RS) (or pilot signals) of antennas 0 to 3. The RS is fixed within the subframe with a constant pattern regardless of the control region and the data region. Control channels are resources, to which the RSs are not allocated, in the control region, and traffic channels are allocated to resources, to which the RSs are not allocated, in the data region. The control channels include a Physical Control Format Indicator Channel (PCFICH), a Physical Hybrid-ARQ Indicator Channel (PHICH), a Physical Downlink Control Channel (PDCCH), and the like.

The PCFICH informs the UE of the number of OFDM symbols used in the PDCCH for each subframe. The PCFICH is located at a first OFDM symbol and is set prior to the PHICH and the PDCCH. The PCFICH is composed of four Resource Element Groups (REGs), and the REGs are distributed within the control region based on a cell Identity (ID). One REG is composed of four Resource Elements (REs). The RE refers to a minimum physical resource defined by one subcarrier×one OFDM symbol. The architecture of the REG will be described in detail with reference to FIG. 7. The PCFICH value indicates a value of 1 to 3 or 2 to 4 according to a bandwidth and is modulated using a Quadrature Phase Shift Keying (QPSK) scheme.

The PHICH is used to transfer a HARQ ACK/NACK signal linked to uplink transmission. That is, the PHICH refers to a channel used for transmitting DL ACK/NACK information for UL HARQ. The PHICH is composed of one REG and is scrambled on cell-specific basis. The ACK/NACK signal is indicated by 1 bit and is modulated using a Binary Phase Shift Keying (BPSK) scheme. The modulated ACK/NACK signal is spread using a Spreading Factor (SF) of 2 or 4. A plurality of PHICHs mapped to the same resources configures a PHICH group. The number of PHICHs multiplexed in the PHICH group is determined according to the number of spreading codes. The PHICH (group) is repeated three times in order to obtain a diversity gain in a frequency domain and/or a time domain.

The PDCCH is allocated to first n OFDM symbols of the subframe. Here, n is an integer of 1 or more and is indicated by the PCFICH. The PDCCH is composed of one or more Control Channel Elements (CCEs), which will be described later in detail. The PDCCH informs UEs or a UE group of information associated with resource allocation of a Paging Channel (PCH) and a Downlink-Shared Channel (DL-SCH) of a transport channel, Uplink scheduling Grant, HARQ information or the like. The PCH and the DL-SCH are transmitted through the PDSCH. Accordingly, the eNB and the UE generally transmit and receive data through the PDSCH except for specific control information or specific service data. Information indicating to which UE (one or a plurality of UEs) the data of the PDSCH is transmitted and how UEs receive and decode the data of the PDSCH is transmitted through the PDCCH. For example, it is assumed that a specific PDCCH is CRC-masked with a Radio Network Temporary Identity (RNTI) "A", and information about data transmitted using radio resource (e.g., frequency location) "B" and transmission format information (e.g., transmission block size, modulation scheme, coding information, or the like) "C" is transmitted via a specific subframe. In this case, a UE located within a cell monitors a PDCCH using its own RNTI information, and if one or more UEs having "A" RNTI are present, the UEs receive the PDCCH and receive the PDSCH indicated by "B" and "C" through the information about the received PDCCH.

FIG. 7 is a diagram showing a resource unit used for configuring a control channel. FIG. 7(a) shows the case where the number of transmission antennas is 1 or 2 and FIG. 7(b) shows the case where the number of transmission antennas is 4, which are different from each other in only an RS pattern according to the number of transmission antennas, but are equal to each other in a method of setting a resource unit associated with the control channel. Referring to FIG. 7, the REG which is the basic resource unit of the control channel is composed of four neighbor REs in a state of excluding the RS. The REG is denoted by a thick line in the drawing. The PCFICH and the PHICH include four REGs and three REGs, respectively. The PDCCH is composed of CCE units and one CCE includes 9 REGs.

The UE is set to confirm M (L) (≥L) CCEs which are arranged consecutively or according to a specific rule in order to determine whether a PDCCH composed of L CCEs is transmitted to the UE. The value L which is considered when the UE receives the PDCCH may be plural. A set of CCEs which should be confirmed when the UE receives the PDCCH is referred to as a PDCCH search space. For example, in the LTE system, the PDCCH search space is defined as shown in Table 1.

TABLE 1

| Type | Search space $S_k^{(L)}$ | | Number of PDCCH candidates $M^{(L)}$ | DCI formats |
| --- | --- | --- | --- | --- |
| | Aggregation level L | Size [in CCEs] | | |
| UE-specific | 1 | 6 | 6 | 0, 1, 1A, 1B, 2 |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

L denotes the number of CCEs configuring the PDCCH, $S_k^{(L)}$ denotes the PDCCH search space, and $M^{(L)}$ denotes the number of PDCCH candidates to be monitored in the search space.

The PDCCH search space may be divided into a UE-specific search space in which access is allowed for only a specific UE and a common search space in which access is allowed for all UEs within a cell. The UE monitors the common search space at L=4 and 8 and monitors the UE-specific search space at L=1, 2, 4 and 8. The common search space and the UE-specific search space may overlap each other.

In addition, the location of a first CCE (having a smallest index) in the PDCCH search space applied to a certain UE with respect to each value L is changed according to the UEs for each subframe. This is referred to as PDCCH search space hashing.

Hereinafter, a method of efficiently transmitting a signal in a wideband system will be described. To facilitate description, the method will be described using a method of transmitting a HARQ ACK/NACK signal. A downlink transmission method of an ACK/NACK signal will first be described and an uplink transmission method of an ACK/NACK signal will then be described. The following examples may be advantageously applied to the case where a wireless communication system is in an asymmetric carrier aggregation state.

EXAMPLE 1

PHICH Allocation Scheme

In the 3GPP LTE system, the PHICH is transmitted through the first m (m≥1) OFDM symbols of the subframe. The PDCCH is transmitted through the remaining REs except for REs used for transmitting the control signals such as the PHICH and the PCFICH within the first n (m≤n) OFDM symbols of the subframe. Accordingly, the UE should check how PHICHs are mapped to subframes in order to receive scheduling information through the PDCCHs of the subframes. The mapping of the PHICHs to the subframes of the cells is determined according to two factors including the number of PHICHs existing in the subframes, N, and the number of OFDM symbols to which the PHICHs are mapped in the subframes, m. Accordingly, the UE should identify the values N and m in order to receive the PDCCHs of the subframes.

In particular, when the UE attempts initial access to a cell, the UE obtains basic system information such as a system bandwidth of the cell. Thereafter, the UE obtains detailed system information through a PDSCH which is used for transmitting general downlink data. Scheduling information of the PDSCH is transmitted through the PDCCH. That is, the UE which performs the initial access receives a PDCCH of a specific subframe after receiving a Physical Broadcast Channel (PBCH), identifies scheduling information of the PDSCH used for transmitting the detailed system information through the PDCCH, and receives the PDSCH so as to identify the detailed system information. Accordingly, since the UE which attempts the initial access should identify the values N and m before obtaining the detailed system information through the PDSCH, the values N and m are included in the basic system information of the PBCH.

Figure 8A:
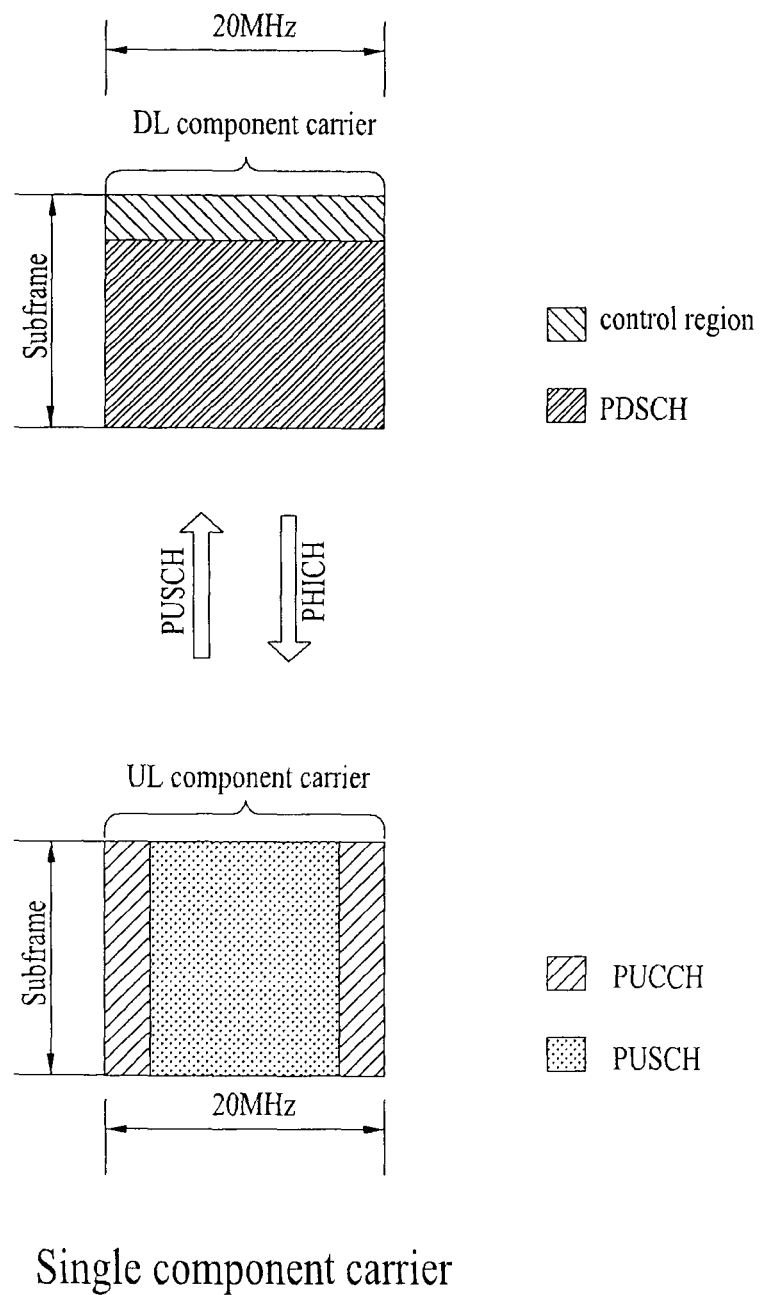
FIGS. 8A and 8B are diagrams showing examples of Physical Hybrid-ARQ Indicator Channel (PHICH) transmission under single-carrier and multi-carrier conditions, respectively.

FIG. 8A shows an example of PHICH transmission in a single component carrier condition. That is, in FIG. 8A, one DL component carrier and one UL component carrier are present and correspond to each other so as to set a PHICH mapping relationship between the UL component carrier and the DL component carrier.

Referring to FIG. 8A, the UE transmits data to the eNB through the PUSCH in uplink, and the eNB transmits an ACK/NACK signal of the data to the UE through the PHICH in downlink. In the transmission structure of the PHICH, a 1-bit ACK/NACK signal is modulated using the BPSK scheme and is then multiplexed using a Code Division Multiplexing scheme so as to be transmitted. In detail, the ACK/NACK signal is In-phase/Quadrature-phase (I/Q)-multiplexed with SF=4 in a subframe using a normal Cyclic Prefix (CP), and is I/Q-multiplexed with SF=2 in a subframe using an extended CP. Since the PHICH is repeated three times, in the normal CP, eight PHICHs configure one PHICH group, which is then transmitted through a total of 12 REs with a pattern, in which four REs are repeated three times. Similarly, in the extended CP, four PHICHs configure one PHICH group, which is then transmitted through a total of six REs with a pattern, in which two REs are repeated three times.

Table 2 shows an example of a sequence used for spreading the ACK/NACK signal.

TABLE 2

| Sequence index $n_{PHICH}^{seq}$ | Orthogonal sequence | |
|---|---|---|
| | Normal cyclic prefix $N_{SF}^{PHICH} = 4$ | Extended cyclic prefix $N_{SF}^{PHICH} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

Meanwhile, since the number of users is changed according to the system bandwidth and the PHICH is a reception response of the uplink data, the number of PHICHs needs to be variably set according to an uplink system bandwidth. However, since the uplink system bandwidth can be identified after receiving the detailed system information through the PDSCH, the uplink system bandwidth cannot be used to determine the number of PHICHs, N. Accordingly, the LTE system sets the number of PHICHs, N, based on a downlink system bandwidth. In detail, the eNB signals a ratio $N_g$ to the overall downlink bandwidth, and the number of PHICH groups $N_{PHICH}^{group}$ is determined by Equation 1.

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases} \quad \text{Equation 1}$$

$N_g$ is signaled by selecting one of four values of {⅙, ½, 1, 2}. For example, if the system bandwidth includes 25 RBs and uses the normal CP, the $N_{PHICH}^{group}$ becomes {1, 2, 4, 7} and the value N becomes {8, 16, 32, 56}.

Figure 8B:
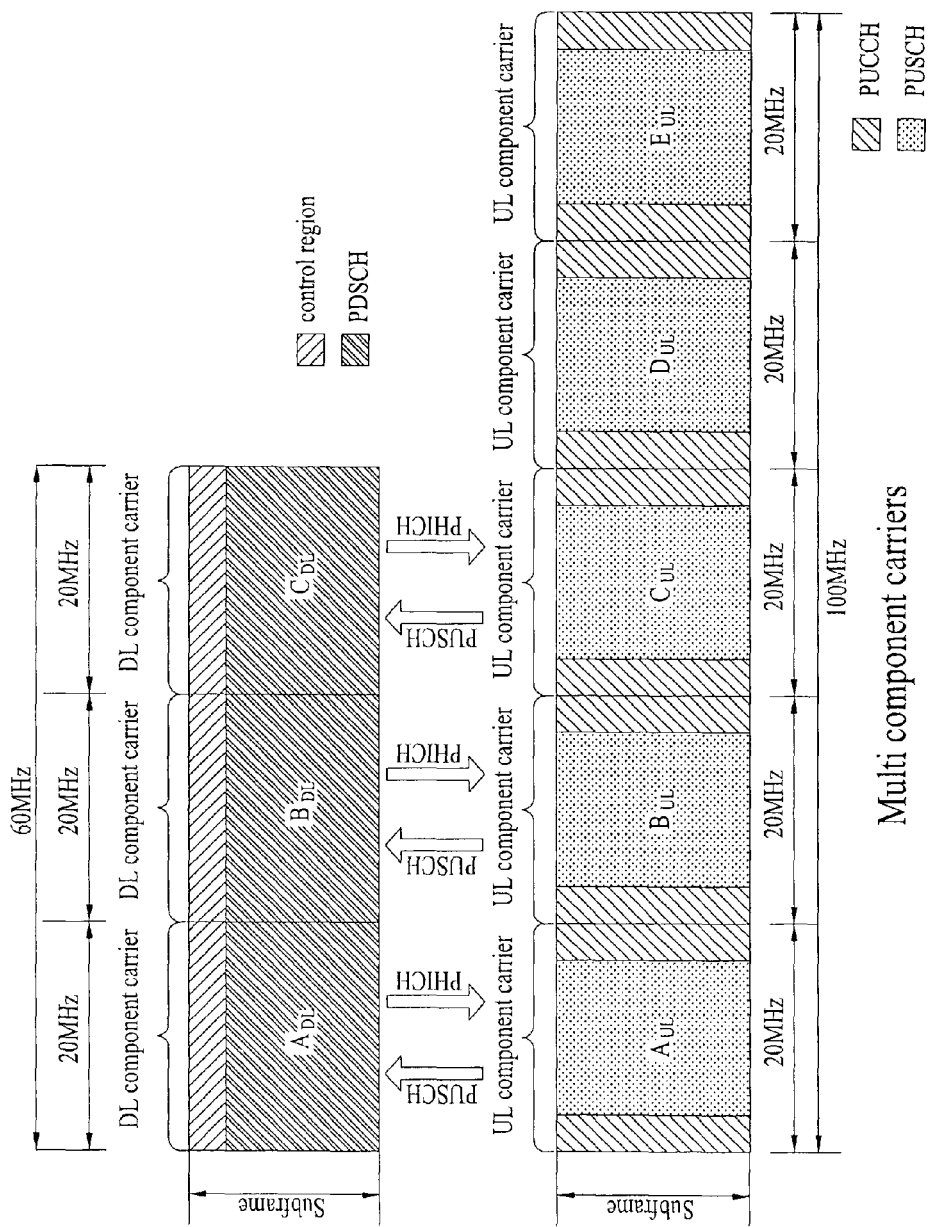

FIG. 8B shows an example of PHICH transmission under a multi-component-carrier condition. As shown in FIG. 8B, the PHICH may be differently set in an eNB/UE system which can simultaneously perform transmission and reception by setting a plurality of frequency bands.

Referring to FIG. 8B, the number of frequency bands $A_{DL}$, $B_{DL}$ and $C_{DL}$ used in downlink is less than the number of frequency bands $A_{UL}$, $B_{UL}$, $C_{UL}$, $D_{UL}$ and $E_{UL}$, used in uplink. An asymmetric component carrier condition may be generated due to the limit of an actually available frequency band or artificially generated by a network configuration. For example, although the overall system band includes N frequency blocks, frequency bands which may be received by a specific UE may be limited to M (<N) frequency blocks. The asymmetric component carrier condition may be set on cell-specific, UE group-specific, or UE-specific basis. If the number of downlink frequency bands is less than the number of uplink frequency bands, PHICH information for transmission of a plurality of uplink PUSCHs should be transmitted through a smaller number of downlink PHICHs.

For example, the PHICH information linked to UL component carriers D and E ($D_{UL}$ and $E_{UL}$) should be transmitted through at least one of the DL component carriers A, B and C ($A_{DL}$, $B_{DL}$ and $C_{DL}$). However, the DL component carriers A, B and C ($A_{DL}$, $B_{DL}$ and $C_{DL}$) are basically mapped so as to transmit the PHICHs linked to the UL component carriers A, B and C ($A_{UL}$, $B_{UL}$ and $C_{UL}$). Accordingly, at least one of the DL component carriers A, B and C ($A_{DL}$, $B_{DL}$ and $C_{DL}$) should additionally transmit the PHICH information of the UL component carriers D and E ($D_{UL}$ and $E_{UL}$). Therefore, at least one of the DL component carriers A, B and C ($A_{DL}$, $B_{DL}$ and $C_{DL}$) should secure resources (that is, PHICH resources of $D_{UL}$ and $E_{UL}$) for additional PHICH transmission in addition to resources (that is, PHICH resources linked to $A_{UL}$, $B_{UL}$ and $C_{UL}$) for existing PHICH transmission.

In addition, even when the number of downlink frequency bands is equal to the number of uplink frequency bands, one UE transmits a plurality of codewords if a transmission scheme such as a Single User-Multiple Input Multiple Output (SU-MIMO) scheme is used in uplink. In this case, the eNB should transmit a plurality of ACK/NACK signals of the codewords to one UE through the PHICH. Accordingly, it is necessary to secure a greater number of PHICH groups than the number of existing PHICH groups defined on the assumption that one PHICH is transmitted to each UE.

However, as can be seen from Equation 1, in the exiting signaling scheme, the number of PHICH groups can be secured up to a maximum of twice the number of downlink Resource Blocks (RBs). Accordingly, a method of additionally securing a PHICH group and a signaling method thereof are necessary. The present invention suggests a method of securing an additional PHICH group using a CCE used for PDCCH transmission and a signaling method thereof. Hereinafter, for convenience, the CCE used for ACK/NACK transmission is referred to as a PHICH CCE.

The CCE is composed of 9 REGs, one PHICH group is transmitted through three REGs in a subframe using a normal CP, and two PHICH groups are transmitted through three REGs in a subframe using an extended CP. Accordingly, one PHICH CCE can transmit three PHICH groups in the subframe using the normal CP and transmit six PHICH groups in the subframe using the extended CP. In consideration of this condition, the number of PHICH CCEs may be determined.

For example, the number of PHICH CCEs, n, may be determined by Equation 2.

Subframe using the normal CP: $n = \text{ceil}(Na/3)$

Subframe using the extended CP: $n = \text{ceil}(Na/6)$      Equation 2 where, Na denotes the number of additionally necessary PHICH groups and ceil denotes a ceiling function.

FIG. 9 is a diagram showing a method of additionally securing a PHICH group using a CCE according to an embodiment of the present invention. In the present embodiment, it is assumed that the total number of CCEs is N. However, this is only exemplary and the number of CCEs may be changed according to a downlink transmission bandwidth and/or the number of OFDM symbols configuring a control region.

Referring to FIG. 9(a), the PHICH CCEs may be consecutively set in all CCEs. In this case, the resources of the PHICH group may be specified by the number of PHICH CCEs and the location of the PHICH CCEs. Although not limited thereto, the number of PHICH CCEs may be determined using Equation 2. Although not limited thereto, the location of the PHICH CCEs may be a start portion or an end portion of all the CCEs. The start location of the PHICH CCEs may be indicated through signaling or previously determined between the eNB and the UE. In addition, the location of the PHICH CCEs may be determined on a cell-specific basis.

Meanwhile, since the number of PDCCHs may be changed according to the amount of control information for each subframe, CCEs may remain in the control region without transmitting control information. Accordingly, preferably, last n CCEs for transmitting the PHICH group may be secured such that the CCEs for PDCCH transmission are least influenced.

Referring to FIG. 9(b), the PHICH CCEs may be distributed in all CCEs. The resources of the PHICH group may be specified by the number of PHICH CCEs and/or a distribution pattern of the PHICH CCEs. The distribution pattern of the PHICH CCEs may be randomly or pseudo-randomly determined. In addition, the distribution pattern of the PHICH CCEs may be previously determined between the eNB and the UE. In addition, the distribution pattern of the PHICH CCEs may be determined using a parameter value shared between the eNB and the UE. FIG. 9(c) shows another example of distributing the PHICH CCEs in all CCEs. Referring to FIG. 9(c), the PHICH CCEs are separated at a predetermined interval. The distribution pattern of the PHICH CCEs, where the PHICH CCEs are distributed for example randomly, pseudo-randomly or at the predetermined interval, may be changed with time according to a rule determined between the eNB and the UE.

Figure 10:
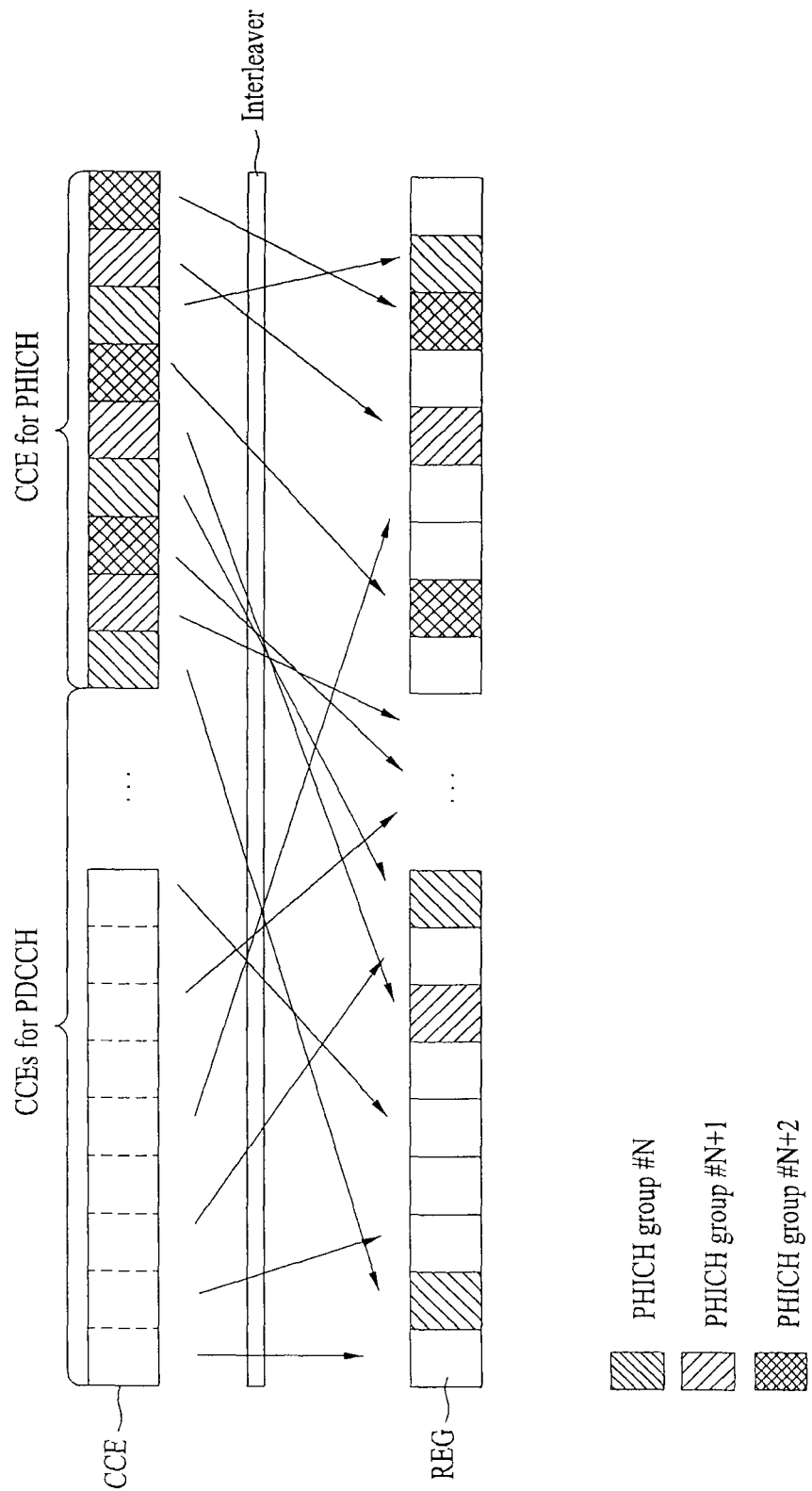
FIG. 10 is a diagram showing an example of distributing PHICH CCEs in a system band.

FIG. 10 is a diagram showing an example of distributing PHICH CCEs in a system band.

Referring to FIG. 10, a plurality of CCEs which are logically consecutive is input to an interleaver. The plurality of CCEs includes CCEs for the PDCCH and CCEs for the PHICH. The interleaver performs a function for interleaving the plurality of CCEs in REG units. Accordingly, the REGs configuring the CCE are scattered in the overall frequency/time domain within the control region of the subframe. Therefore, the PHICH groups are physically scattered within the overall frequency band of the control region although they are allocated to logically consecutive or close locations within the PHICH CCEs. Accordingly, frequency diversity and interference randomization gain can be maximized.

Figure 11:
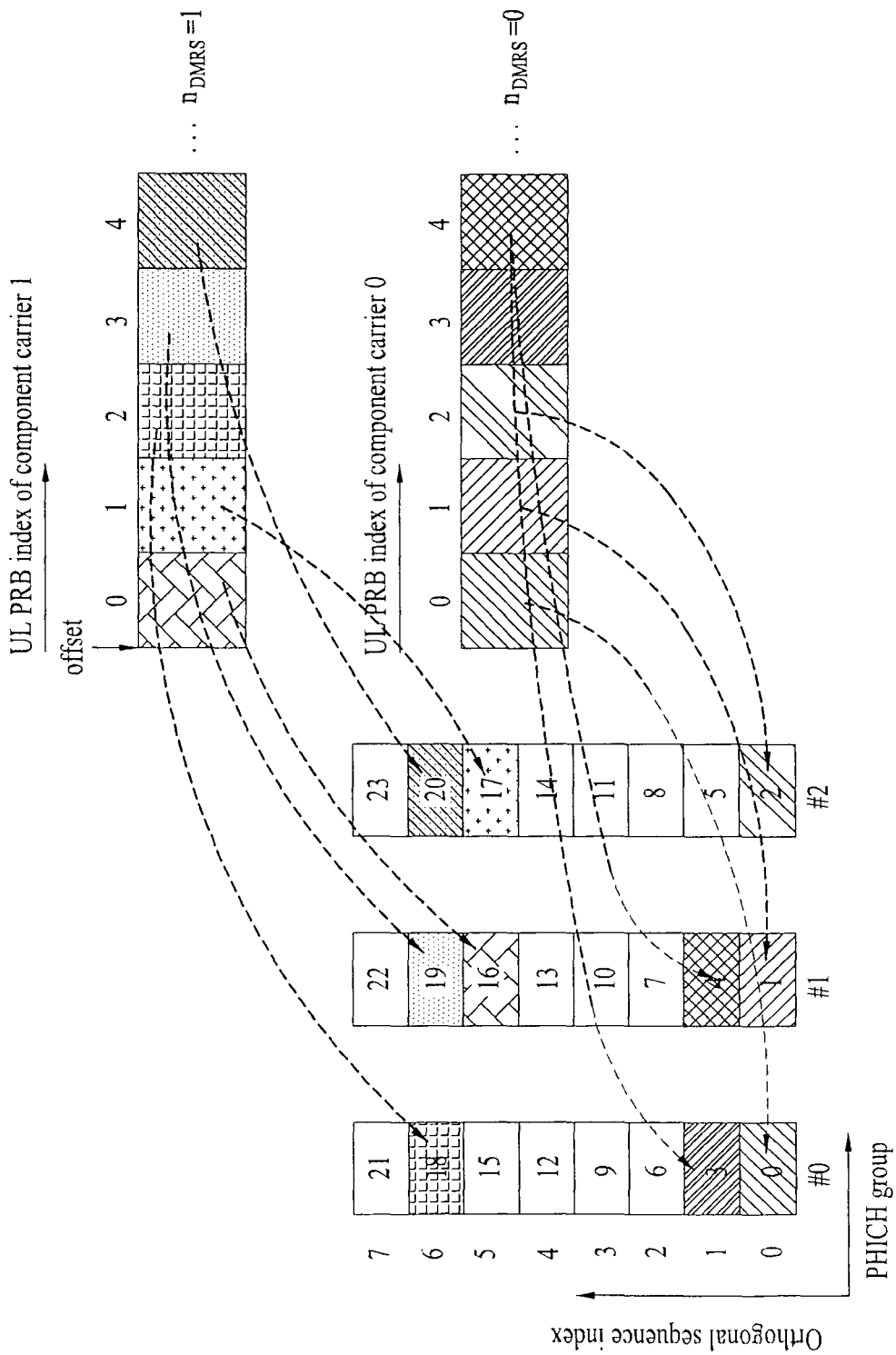
FIG. 11 is a diagram showing an example of allocating indexes to additionally secured PHICH resources according to an embodiment of the present invention.

FIG. 11 is a diagram showing an example of allocating indexes to additionally secured PHICH resources according to an embodiment of the present invention. The PHICH resources are specified by an index pair composed of a PHICH group index and an orthogonal sequence index.

Referring to FIG. 11, the PHICH group index and the orthogonal sequence index are automatically determined in association with an uplink physical RB (UL PRB). In this case, the PHICH group index and the orthogonal sequence index may be determined in consideration of a cyclic shift value $n_{DMRS}$ of a demodulation RS. Meanwhile, if one DL component carrier is mapped to two or more UL component carriers, the UL PRB indexes may overlap each other. Accordingly, the UL PRB indexes derived from the UL component carriers may be construed such that at least portions thereof do not overlap with each other. That is, the UL PRB indexes derived from the UL component carriers may be construed not to be overlapped with each other or to be overlapped with each other only within a predetermined range. For example, different offsets may be applied to the UL PRB indexes according to the component carriers.

Figure 12:
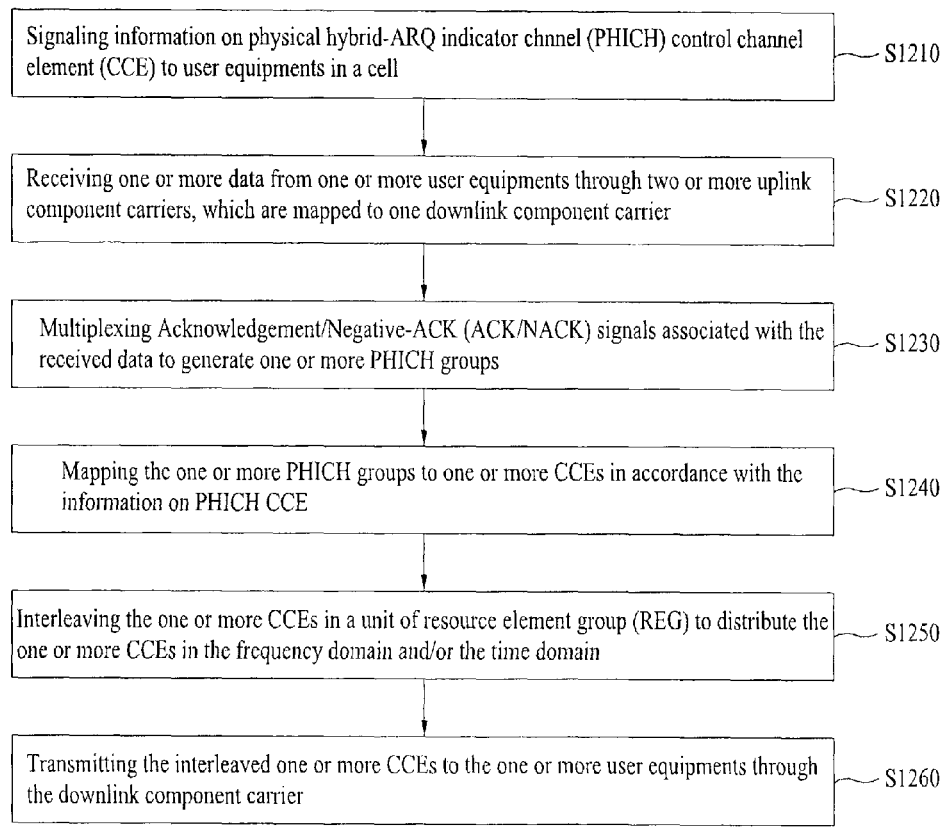
FIG. 12 is a flowchart illustrating a method of transmitting an Acknowledgement (ACK)/Negative ACK (NACK) signal through a PHICH CCE according to an embodiment of the present invention.

FIG. 12 is a flowchart illustrating a method of transmitting an ACK/NACK signal through a PHICH CCE according to an embodiment of the present invention.

Referring to FIG. 12, an eNB signals information on PHICH CCEs to UEs (S1210). The information on the PHICH CCEs includes at least one of information on the number of PHICH CCEs and information on the location of the PHICH CCEs, but is not limited thereto. The information on the PHICH CCEs may be provided using a specific number or a specific ratio. The information on the PHICH CCEs may be implicitly or explicitly signaled. For example, in the DL component carriers, the number of PHICH CCEs may be determined by a combination of component carriers and/or the bandwidths of the component carriers within the system. Meanwhile, a network may set and broadcast the number of PHICH CCEs for the DL component carriers through a BCH on a cell-specific basis. Alternatively, the network may set and transmit the number of PHICH CCEs for the DL component carriers to the UEs through UE-specific RRC signaling on a UE-specific basis. In the DL component carriers, the PHICH CCEs may be consecutively allocated from a specific CCE of the CCEs aligned in logical order, may be allocated at a specific CCE interval, or may be allocated with a specific pattern. In this case, the index of a first CCE used as the PHICH CCE or a parameter for identifying the location of the CCE may be transmitted to the UEs through a BCH or UE-specific RRC signaling.

Thereafter, the eNB receives data from one or more UEs through a plurality of UL component carriers. In the present embodiment, the plurality of UL component carriers is mapped to one DL component carrier (S1220). The eNB multiplexes acknowledgement (ACK)/negative-ACK (NACK) signals associated with the received data to generate one or more PHICH groups (S1230). The PHICH resources for the ACK/NACK signals are mapped to the uplink RB indexes in one-to-one correspondence or one-to-plurality correspondence on a cell-specific or UE-specific basis. The PHICH resources associated with the UE which transmits PUSCH data through a plurality of uplink resource blocks may be mapped to a first or last RB index of the uplink resource blocks. Thereafter, the eNB maps one or more PHICH groups to one or more CCEs in accordance with information on the PHICH CCEs (S1240). Thereafter, the eNB interleaves the CCEs in REG units to distribute one or more PHICH CCEs in the frequency domain and/or the time domain (S1250). The eNB transmits the PHICH CCEs, to which the PHICH groups are mapped, to the UEs through the DL component carriers (S1260).

Figure 13:
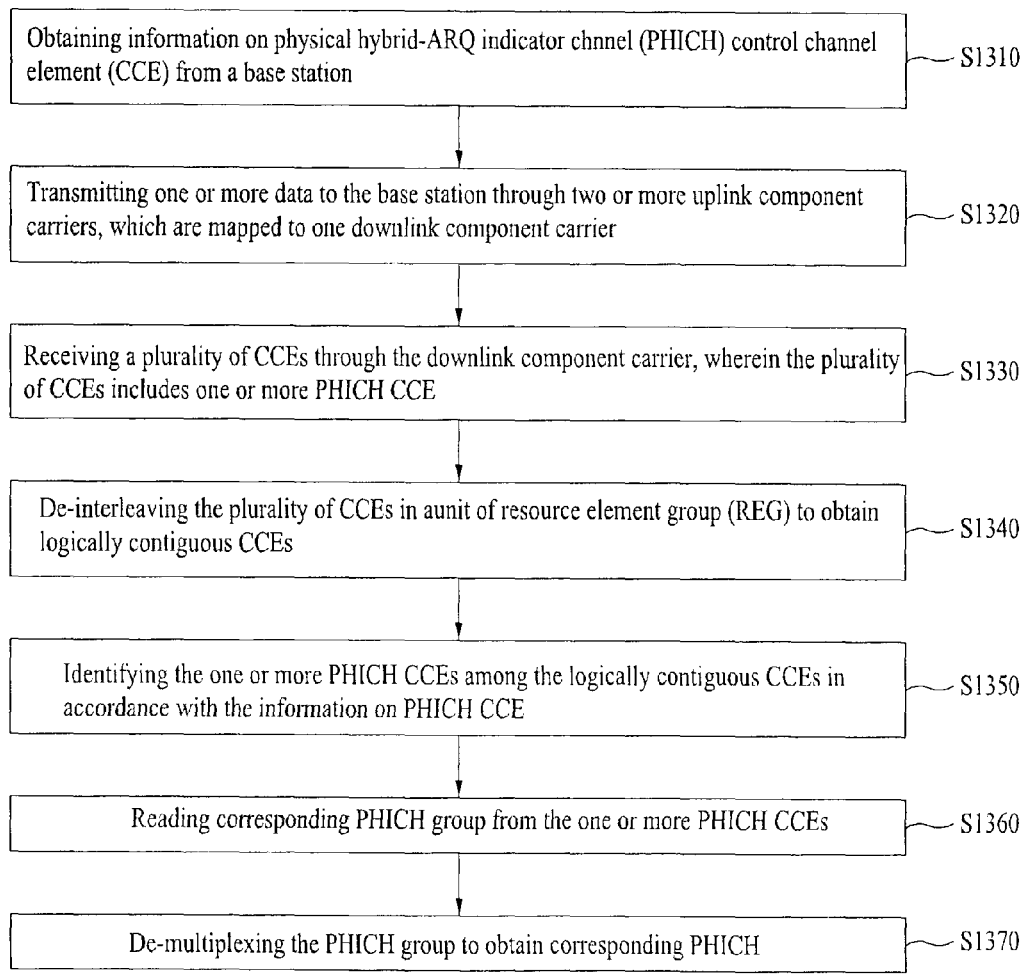
FIG. 13 is a flowchart illustrating a method of receiving an ACK/NACK signal through a PHICH CCE according to an embodiment of the present invention.

FIG. 13 is a flowchart illustrating a method of receiving an ACK/NACK signal through a PHICH CCE according to an embodiment of the present invention. The basic procedure is performed in reverse order of FIG. 12.

Referring to FIG. 13, a UE obtains information on PHICH CCEs from an eNB (S1310). The eNB transmits data to the eNB through a plurality of UL component carriers (S1320). In the present embodiment, the plurality of UL component carriers is mapped to one DL component carrier. Thereafter, the UE receives a plurality of CCEs through the DL component carrier (S1330). The plurality of CCEs includes one or more PHICH CCEs. The UE deinterleaves the plurality of CCEs in REG units to obtain logically contiguous CCEs (S1340). The UE identifies one or more PHICH CCEs from the logically contiguous CCEs in accordance with the information on the PHICH CCEs (S1350). The UE reads a corresponding PHICH group from one or more PHICH CCEs (S1360). The UE demultiplexes the read PHICH group to obtain a corresponding PHICH (S1370).

EXAMPLE 2

PUCCH Index Allocation Scheme

Figure 14:
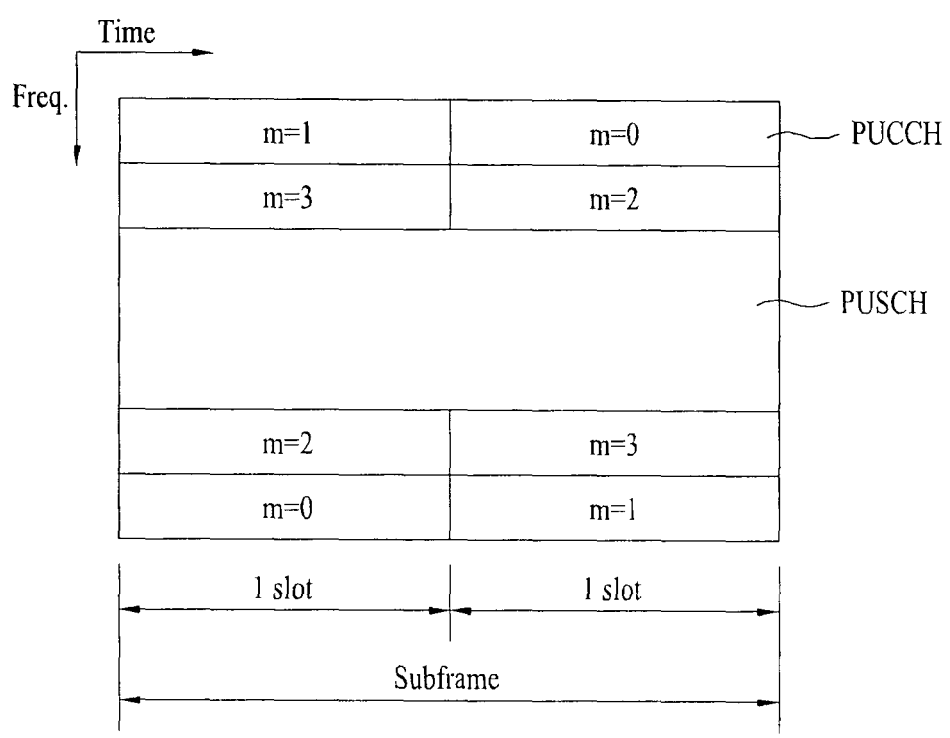
FIG. 14 is a diagram showing the architecture of an uplink subframe.

FIG. 14 is a diagram showing the architecture of an uplink subframe.

Referring to FIG. 14, an uplink subframe may be divided into a region to which a PUCCH for transmitting control information is allocated and a region to which a PUSCH for transmitting user data is allocated. An intermediate portion of the subframe is allocated to the PUSCH, and both sides of a data region are allocated to the PUCCH in the frequency domain. The control information transmitted on the PUCCH includes the ACK/NACK used for HARQ, a Channel Quality Indicator (CQI) indicating a downlink channel state, a Rank Indicator (RI) for MIMO, and a Scheduling Request (SR) of an uplink resource allocation request. The PUCCH for one UE uses one resource block occupying different frequencies in each slot within the subframe. That is, two resource blocks allocated to the PUCCH are frequency-hopped in a slot boundary. FIG. 14 shows the case where a PUCCH having m=0, a PUCCH having m=1, a PUCCH having m=2, and a PUCCH having m=3 are allocated to the subframe.

Figure 15:
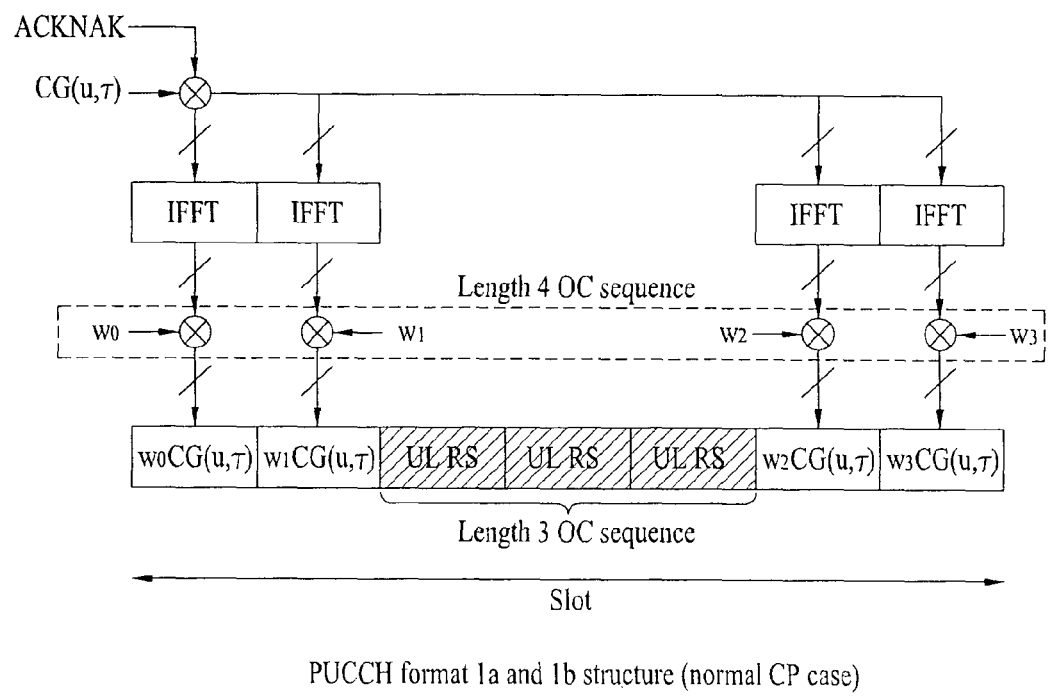
FIG. 15 is a diagram showing a PUCCH 1a/1b structure for ACK/NACK transmission.

FIG. 15 is a diagram showing a PUCCH 1a/1b structure for ACK/NACK transmission.

Referring to FIG. 15, in a normal CP, a slot includes seven SC-FDMA symbols. RSs are carried on three consecutive SC-FDMA symbols located at the intermediate portion of the slot and an ACK/NACK signal is carried on four remaining SC-FDMA symbols. In an extended CP, a slot includes six SC-FDMA symbols and RSs are carried on third and fourth SC-FDMA symbols. Resources for the ACK/NACK signal are divided using different Cyclic Shifts (CSs) (frequency spreading) of a Computer Generated Constant Amplitude Zero Auto Correlation (CG-CAZAC) sequence and different Walsh/DFT orthogonal codes (time spreading). The result of multiplying w0, w1, w2 and w3 after IFFT is equal to the result of multiplying w0, w1, w2 and w3 before IFFT. The resource blocks for the ACK/NACK signal are orthogonally allocated in the frequency domain. If it is assumed that the number of available CSs is 6 and the number of available Walsh/DFT codes is 3, 18 UEs may be multiplexed in one resource block. In the LTE system, the PUCCH resources for ACK/NACK transmission are indicated by indexes indicating a pair of a CS and an orthogonal code.

Figure 16A:
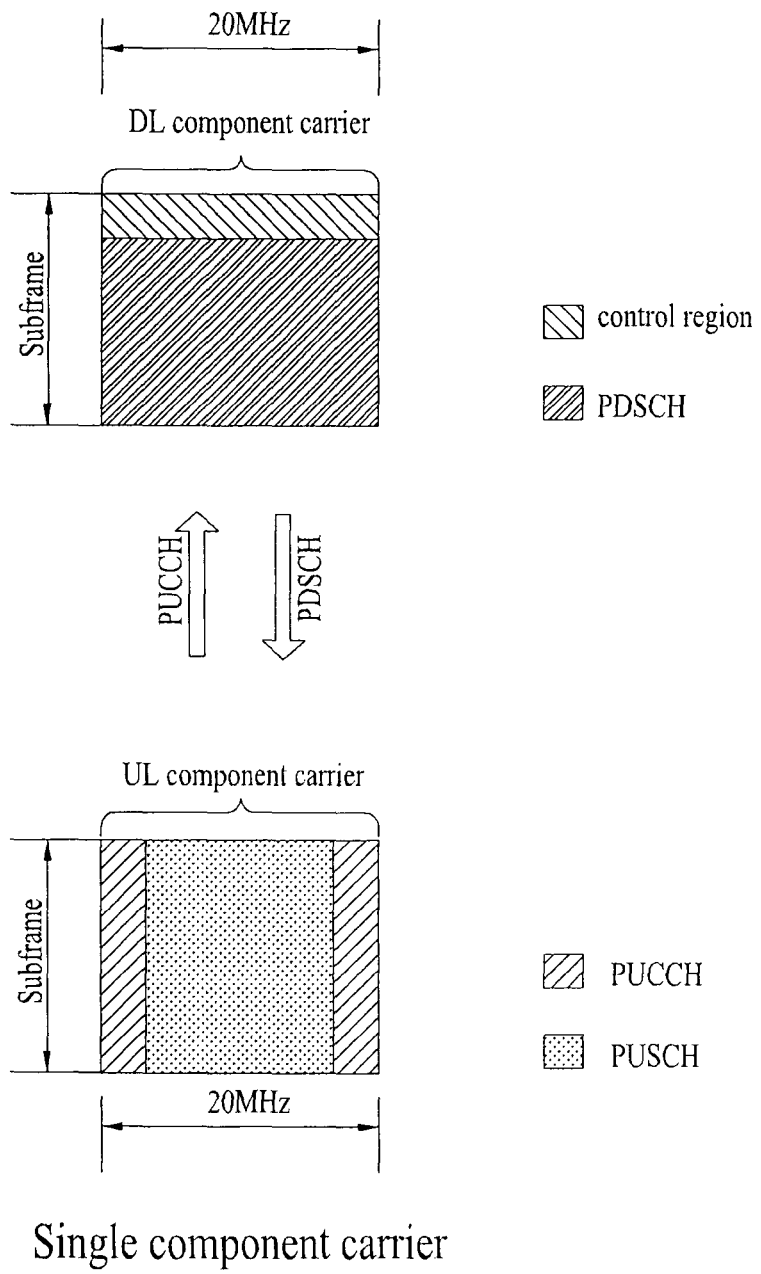
FIGS. 16A and 16B are diagrams showing examples of PUCCH transmission under single-carrier and multi-carrier conditions, respectively.

FIG. 16A is a diagram showing an example of ACK/NACK transmission through a PUCCH in a single component carrier condition. That is, FIG. 16A shows the case where one DL component carrier and one UL component carrier are present and correspond to each other so as to set a mapping relationship of the PUCCH between the UL component carrier and the DL component carrier.

Referring to FIG. 16A, the ACK/NACK signal for downlink PDSCH transmission is transmitted through the uplink PUCCH. The uplink PUCCH resources for the ACK/NACK signal are automatically determined by Equation 3 according to a CCE having a smallest index out of CCEs configuring the PDCCH for transmitting the control information for downlink PDSCH transmission. That is, the indexes of the PUCCH resources are determined according to the CCEs used for PDCCH transmission.

$$n_{PUCCH}^{(1)} = n_{CCE} + N_{PUCCH}^{(1)} \quad \text{Equation 3}$$

where, $n^{(1)}_{PUCCH}$ denotes the indexes of the PUCCH resources for transmitting the ACK/NACK signal, $N^{(1)}_{PUCCH}$ denotes a signaling value received from an upper layer, and $n_{CCE}$ denotes a lowest index of a CCE used for PDCCH transmission for the PDSCH.

Figure 16B:
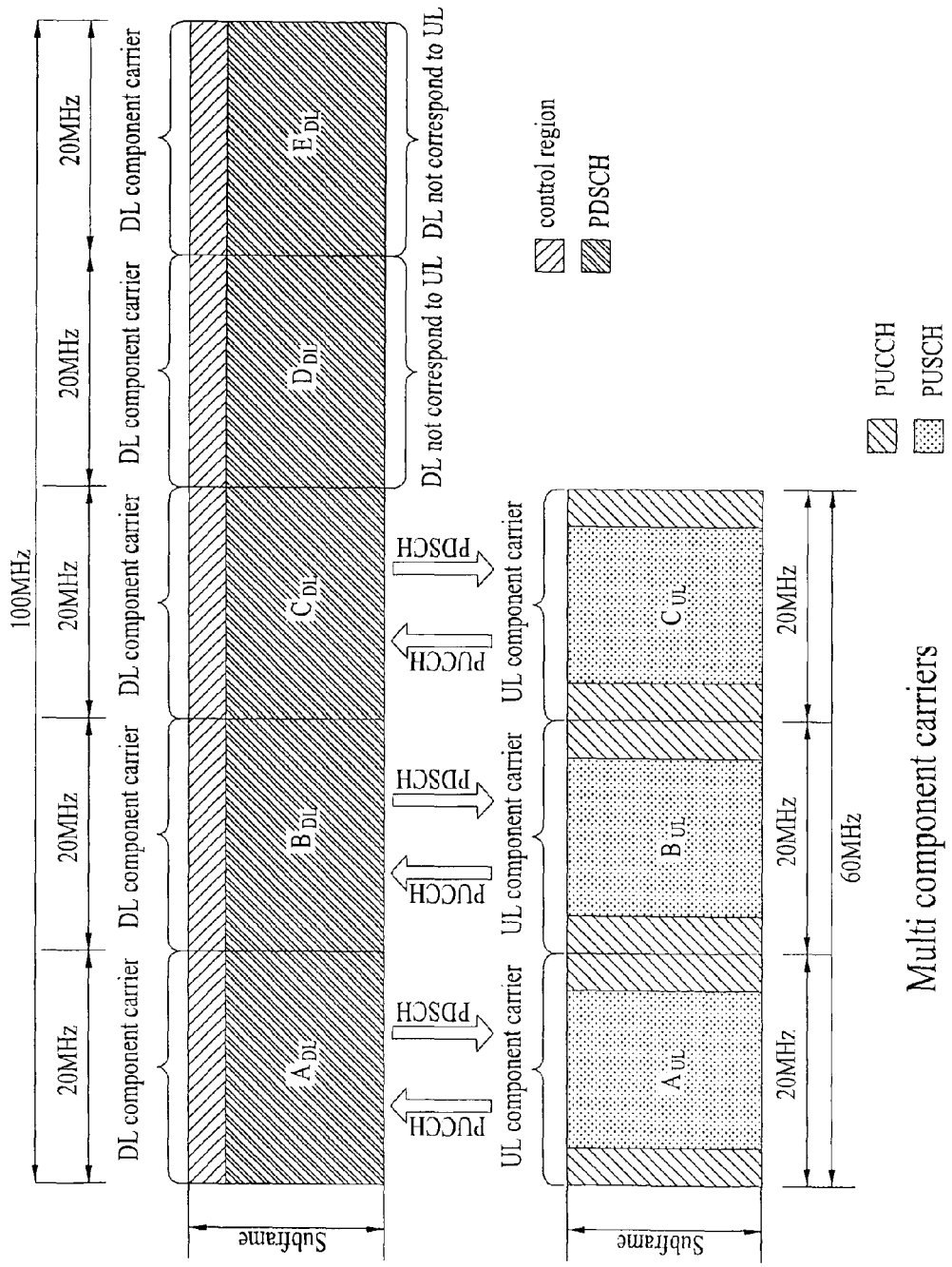

FIG. 16B shows an example of ACK/NACK transmission through a PUCCH in a multi-component-carrier condition. As shown in FIG. 16B, a CCE-to-PUCCH index mapping scheme may need to be differently set in an eNB/UE which can simultaneously perform transmission and reception by setting a plurality of frequency bands.

Referring to FIG. 16B, if the number of frequency bands used in downlink is greater than the number of frequency bands used in uplink, ACK/NACK information associated with transmission of a plurality of downlink PDSCHs should be transmitted through a smaller number of uplink PUCCHs. For example, in FIG. 16B, the PUCCH linked to the DL component carriers D and E ($D_{DL}$ and $E_{DL}$) should be transmitted through at least one of the UL component carriers A, B and C ($A_{UL}$, $B_{UL}$ and $C_{UL}$). However, the UL component carriers A, B and C ($A_{UL}$, $B_{UL}$ and $C_{UL}$) may basically transmit the PUCCH linked to the DL component carriers A, B and C ($A_{DL}$, $B_{DL}$ and $C_{DL}$), respectively. Accordingly, at least one of the UL component carriers A, B and C ($A_{UL}$, $B_{UL}$ and $C_{UL}$) should additionally transmit the PUCCH associated to the DL component carriers D and E ($D_{DL}$ and $E_{DL}$). Therefore, a scheme of mapping PUCCH indexes to the additional CCEs (e.g., CCEs of $D_{DL}$ and $E_{DL}$) as well as a scheme of mapping PUCCH indexes to the existing CCEs (e.g., CCEs of $A_{DL}$, $B_{DL}$ and $C_{DL}$) is necessary in the UL component carriers A, B and C ($A_{UL}$, $B_{UL}$ and/or $C_{UL}$).

In the present invention, if one UL component carrier is mapped to a plurality of DL component carriers, a scheme of mapping the carriers such that at least portions of the CCEs of the plurality of DL component carriers do not overlap with each other is suggested. That is, the CCEs derived from the DL component carriers may be mapped not to be overlapped each other or to be overlapped each other only within a predetermined range. For convenience, the DL component carrier mapped to the UL component carrier in one-to-one correspondence is referred to as a normal component carrier. In addition, the DL component carrier additionally mapped to the UL component carrier is referred to as an extended component carrier.

Hereinafter, a detailed description will be given with reference to the drawings. Hereinafter, it is assumed that two DL component carriers (DL CC0 and DL CC1) are mapped to one UL component carrier (UL CC0). For convenience, it is assumed that DL CC0 is the normal DL component carrier and DL CC1 is the extended DL component carrier. In the case of DL CC0, it is assumed that N CCEs have indexes of 0 to N−1. In the case of DL CC1, it is assumed that M CCEs have indexes of 0 to M−1. In this case, if DL CC0 is equal to DL CC1 in $N^{(1)}_{PUCCH}$ which is the signaling value of the upper layer, the indexes of two DL CCEs may also overlap when determining the PUCCH indexes, which makes it difficult to map the PUCCH indexes according to Equation 3.

Figure 17:
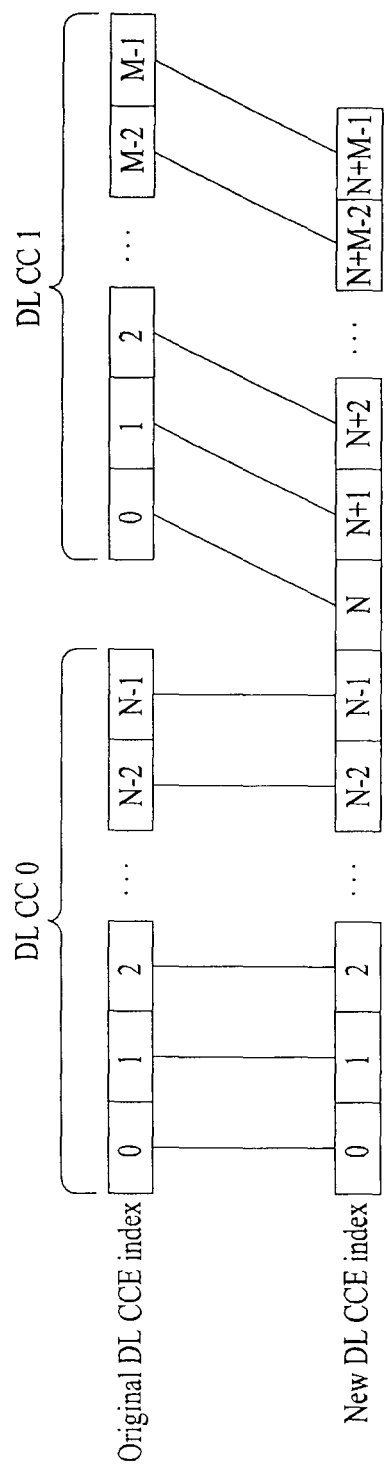
FIGS. 17 to 20 are diagrams illustrating other examples of allocating PUCCH indexes for ACK/NACK transmission if uplink and downlink bandwidths are asymmetric, according to an embodiment of the present invention.

FIG. 17 shows an example of allocating PUCCH indexes for ACK/NACK transmission if uplink and downlink bandwidths are asymmetric, according to one embodiment of the present invention.

Referring to FIG. 17, the CCE indexes (0 to M−1) of the extended DL component carriers may be consecutively mapped to the CCE indexes (0 to N−1) of the normal DL component carriers. For example, in the case of DL CC0 corresponding to the UL component carrier, the CCE indexes are determined similar to the existing scheme and, in the case of DL CC1 which does not correspond to the UL component carrier, new CCE indexes may be defined from N to N+M−1 subsequent to the CCE indexes of DL CC0. If the UL CCE-to-PUCCH mapping scheme is applied using the newly defined CCE indexes, a problem due to overlapping of CCE indexes may be solved. In this case, the CCE indexes of DL CC1 may be originally used from 0 to M−1 in association with PDCCH transmission. The CCE indexes which are newly defined according to the present embodiment may be determined by Equation 4.

$$n_{CCE,new} = N_{CCE,cc0} + n_{CCE,cc1}$$

$$n_{PUCCH}^{(1)} = n_{CCE,new} + N_{PUCCH}^{(1)} \quad \text{Equation 4}$$

where, $n_{CCE,new}$ denotes the CCE index which is newly defined with respect to DL CC1. $N_{CCE,cc0}$ denotes the total number of CCEs of DL CC0, $n_{CCE,cc1}$ denotes the CCE index of DL CC1, $n^{(1)}_{PUCCH}$ denotes the index of the PUCCH resource for transmitting the ACK/NACK signal, and $N^{(1)}_{PUCCH}$ denotes a signaling value received from an upper layer.

For generalization, a parameter associated with DL CC0 may be replaced with the value of the normal component carrier and a parameter associated with DL CC1 may be replaced with the value of the extended component carrier. In Equation 4, it is assumed that two DL component carriers are mapped to one UL component carrier. However, Equation 4 may be similarly extended even in the case where three or more DL components are mapped. In addition, Equation 4 is simply exemplified in order to facilitate the understanding of the present invention, and thus it may be adequately modified for the case that two or more extended DL component carries are used.

Figure 18:
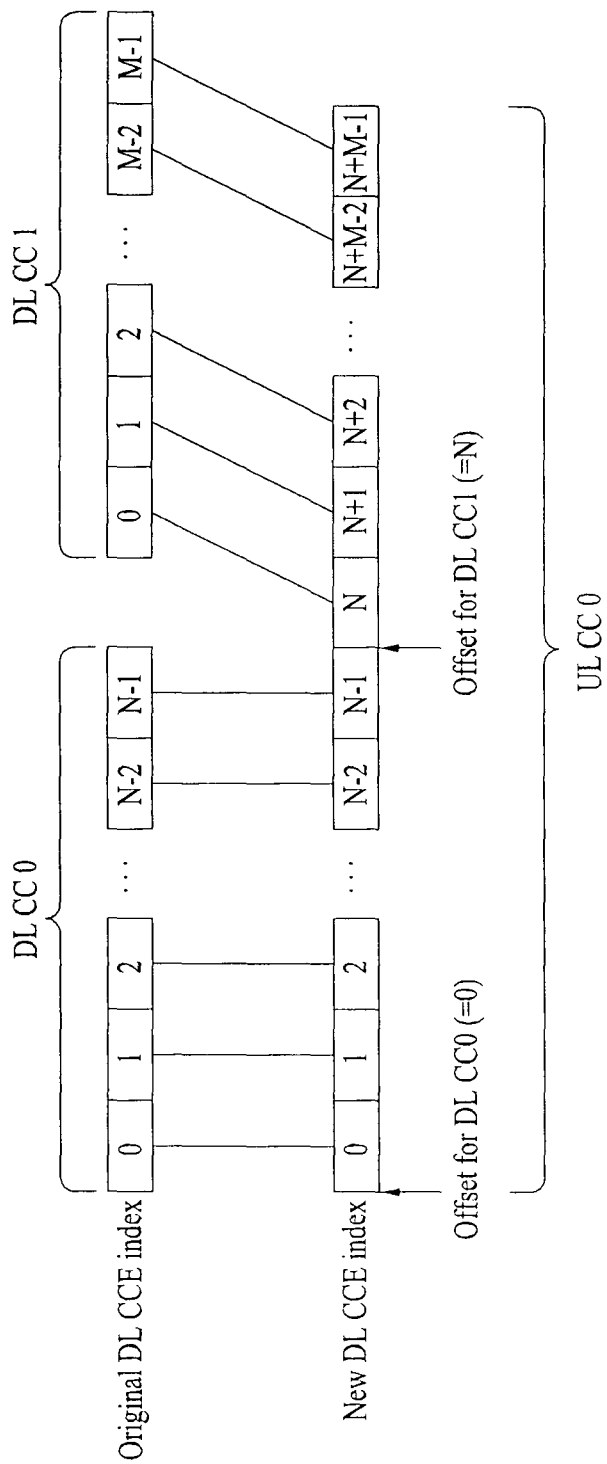

FIG. 18 shows another example of allocating PUCCH indexes for ACK/NACK transmission if uplink and downlink bandwidths are asymmetric, according to one embodiment of the present invention.

Referring to FIG. 18, with respect to one UL component carrier (UL CC0), start points of the PUCCH indexes to which the CCE indexes of the DL component carriers (DL CC0 and DL CC1) are mapped may be independently set for each DL component carrier. For example, start points of the PUCCH indexes to which the CCE indexes of the DL component carriers are mapped may be independently set using offset. If the offset is used, the PUCCH indexes associated with each DL component carrier may be determined by Equation 5.

$$n^{(1)}_{PUCCH} = n_{CCE,cc0} + N^{(1)}_{PUCCH} + OS_{cc0} \text{ (DL CC0 case)}$$

$$n^{(1)}_{PUCCH} = n_{CCE,cc1} + N^{(1)}_{PUCCH} + OS_{cc1} \text{ (DL CC0 case)} \quad \text{Equation 5}$$

where, $n^{(1)}_{PUCCH}$ denotes the index of the PUCCH resource for transmitting the ACK/NACK signal, $N^{(1)}_{PUCCH}$ denotes a signaling value received from an upper layer, $n_{CCE,cc0}$ and $n_{CCE,cc1}$ respectively denote the lowest indexes of the CCEs used for transmitting the PDCCH for PDSCH in DL CC0 and DL CC1, and $OS_{cc0}$ and $OS_{cc1}$ respectively denote offset values applied to DL CC0 and DL CC1.

In Equation 5, it is assumed that two DL component carriers are mapped to one UL component carrier. However, Equation 5 may be similarly extended even in the case where three or more DL components are mapped. In addition, Equation 5 is simply exemplified in order to facilitate the understanding of the present invention, and thus it may be adequately modified for the case that two or more extended DL component carries are used.

Figure 19:
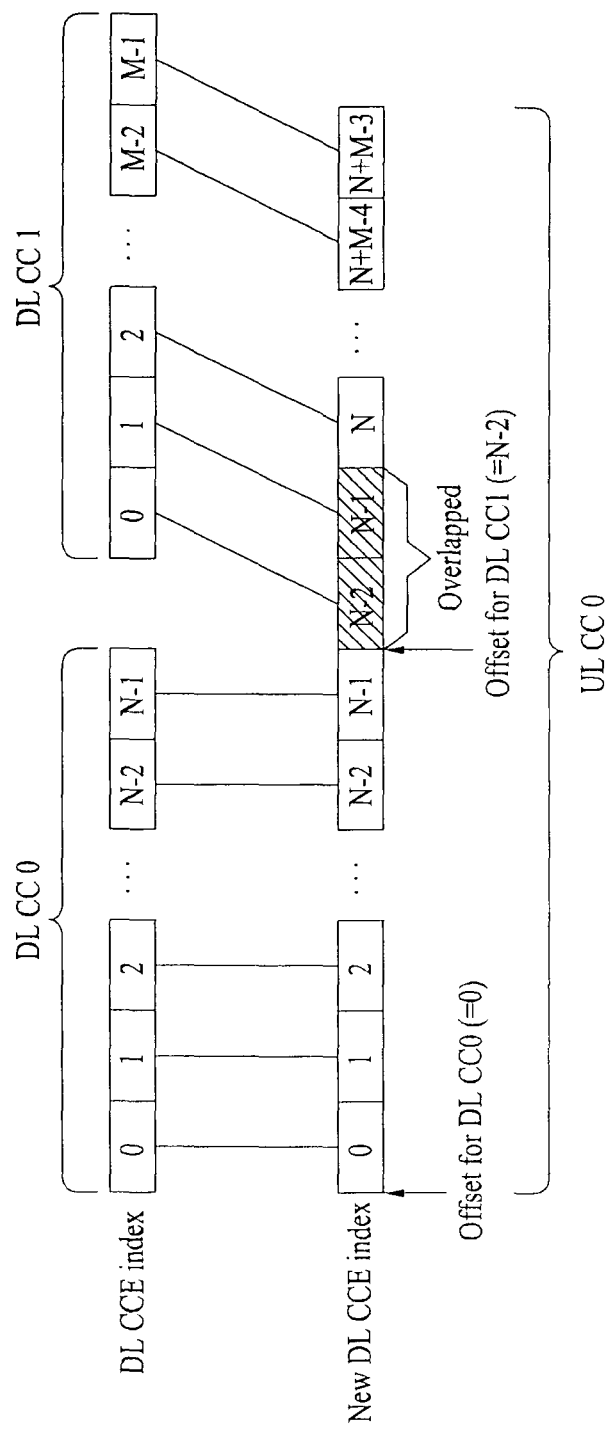

FIG. 19 shows another example of allocating PUCCH indexes for ACK/NACK transmission if uplink and downlink bandwidths are asymmetric, according to one embodiment of the present invention.

Referring to FIG. 19, some of the CCEs of different DL component carriers may be construed to have the same index (thus, the same PUCCH index). In the present embodiment, it is assumed that the offset value of DL CC0 is 0 and the offset value of DL CC1 is N−2 in Equation 5. Even when some of the CCEs of the different component carriers are mapped to the same PUCCH index, actual collision of the PUCCH index may be avoided in a manner of disabling an eNB scheduler to simultaneously use the CCEs mapped to the same PUCCH index. Accordingly, the offset values applied to the DL component carriers do not need to be set such that the CCEs of the different component carriers do not overlap each other exclusively.

Figure 20:
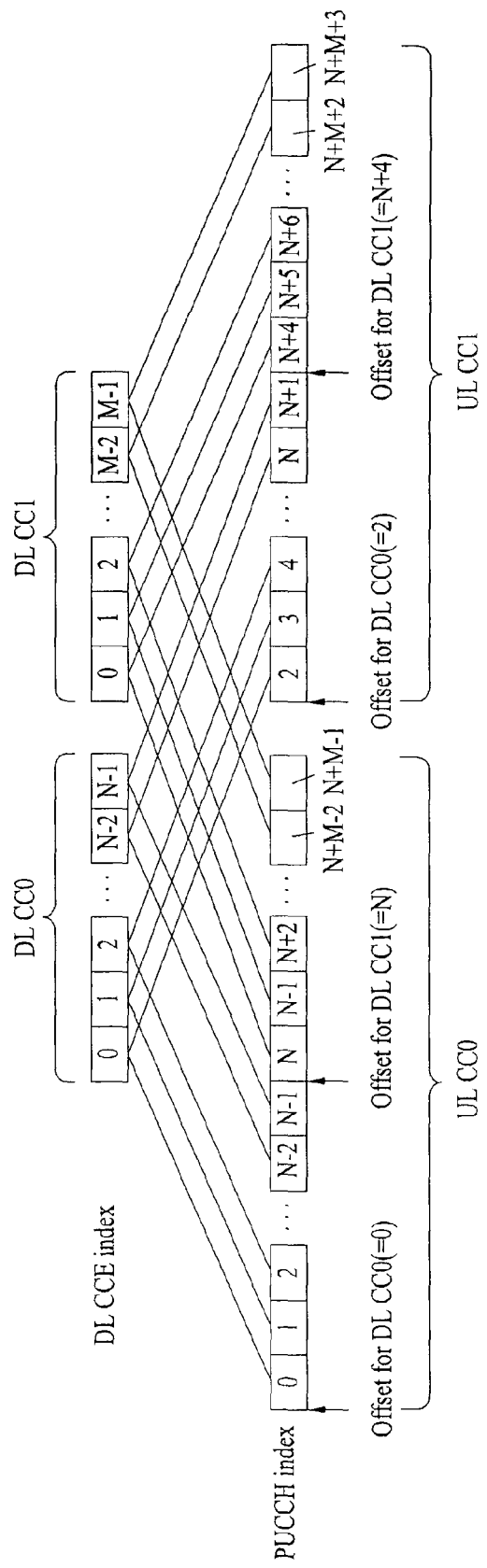

FIG. 20 shows another example of allocating PUCCH indexes for ACK/NACK transmission if uplink and downlink bandwidths are asymmetric, according to one embodiment of the present invention.

Referring to FIG. 20, the case where a plurality of DL component carriers is mapped to one UL component carrier may be divided into a case of fixing a mapping scheme on a cell-specific basis and a case of fixing a mapping scheme on a UE-specific basis. That is, when the number of DL component carriers is actually greater than the number of UL component carriers within the cell, all or some of the UL component carriers may be set to be mapped to the plurality of DL component carriers. In addition, the mapping scheme may be differently set according to UEs in consideration of the uplink/downlink frequency band transmission/reception capability of the UE or the like, regardless of whether the number of uplink component carriers is equal to the number of downlink component carriers.

For example, it is assumed that two DL component carriers and two UL component carriers exist within a cell. In this case, if UEs capable of receiving two component carrier bands in downlink but transmitting only one component carrier band in uplink are present, a network may set some of the UEs having such capability to use a $0^{th}$ UL component carrier UL CC0 and set the remaining UEs to use a $1^{st}$ UL component carrier UL CC1. In this case, a first offset for mapping the CCE of the $0^{th}$ DL component carrier DL CC0 to the UL CC0 PUCCH index and a first offset for mapping the CCE of the $1^{st}$ DL component carrier DL CC1 to the UL CC0 PUCCH index may be independently set. Similarly, a third offset between DL CC0 and UL CC1 and a fourth offset between DL CC1 and UL CC1 may be independently set.

If the mapping of the DL component carrier for transmitting the PDCCH and the UL component carrier for transmitting the ACK/NACK signal is set to be fixed within the cell, the CCE index offset or the PUCCH index offset associated with the DL component carrier may be independently set according to the DL/UL component carrier mapping and may be broadcast to the UEs within the cell. Meanwhile, if the mapping of the DL component carrier for transmitting the PDCCH and the UL component carrier for transmitting the ACK/NACK signal is set to be fixed for each UE, the CCE index offset or the PUCCH index offset associated with the DL component carrier may be independently set with respect to the mapping of the DL/UL component carrier(s) set to the UEs and may be signaled to the UEs.

Preferably, in mapping a plurality of DL component carriers to one UL component carrier, the CCE index offset or the PUCCH index offset may be independently set and broadcast/signaled for each DL component carrier.

Preferably, in mapping a plurality of DL component carrier to one UL component carrier, the CCE index offset or the PUCCH index offset may be set and broadcast/signaled such that the CCEs of the different DL component carriers are not mapped to the same PUCCH ACK/NACK index.

Figure 21:
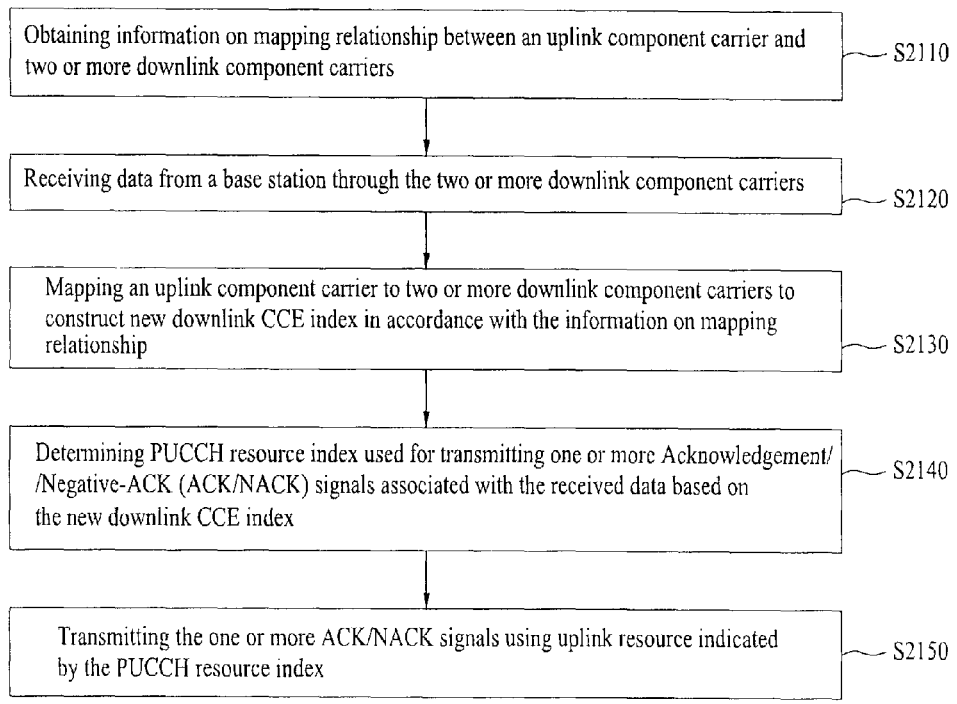
FIG. 21 is a flowchart illustrating a method of transmitting an ACK/NACK signal through a PUCCH according to an embodiment of the present invention.

FIG. 21 is a flowchart illustrating a method of transmitting an ACK/NACK signal through a PUCCH according to an embodiment of the present invention.

Referring to FIG. 21, the eNB obtains information on a mapping relationship between one UL component carrier and two or more DL component carriers (S2110). The information on the mapping relationship may include information for disabling all or at least some of the CCEs of different DL component carriers to overlap with each other. Alternatively, the information on the mapping relationship may include information for disabling PUCCH resource indexes to which the CCEs of different DL component carriers are mapped to overlap each other. For example, the information on the mapping relationship may include information on an offset value applied to the DL component carrier. The offset value may include a CCE index offset or PUCCH resource index offset. The information on the mapping relationship may be implicitly or explicitly signaled. For example, the information on the mapping relationship may be determined by a combination of the component carriers and/or the bandwidths of the component carriers within the system. Meanwhile, a network may set the information on the mapping relation based on cell-specific or UE-specific basis and broadcast it through a BCH. The information on the mapping relationship may be independently set for each DL component carrier. Alternatively, the network may set the information on the mapping relationship based on UE-specific basis and transmit it to the UEs through UE-specific RRC signaling.

Thereafter, the UE receives data from the eNB through two or more DL component carriers (S2120). The UE maps one UL component carrier to two or more DL component carriers to construct a new DL CCE index (S2130). In the construction of the new DL CCE index, for example, the CCE of each of the DL component carriers may be directly mapped to the new PUCCH resource index without constructing the new DL CCE. The UE determines the PUCCH resource index used for transmitting the ACK/NACk signal using the new CCE index (S2140). Thereafter, the eNB transmits the ACK/NACK signal using UL resource indicated by the PUCCH resource index (S2150).

Figure 22:
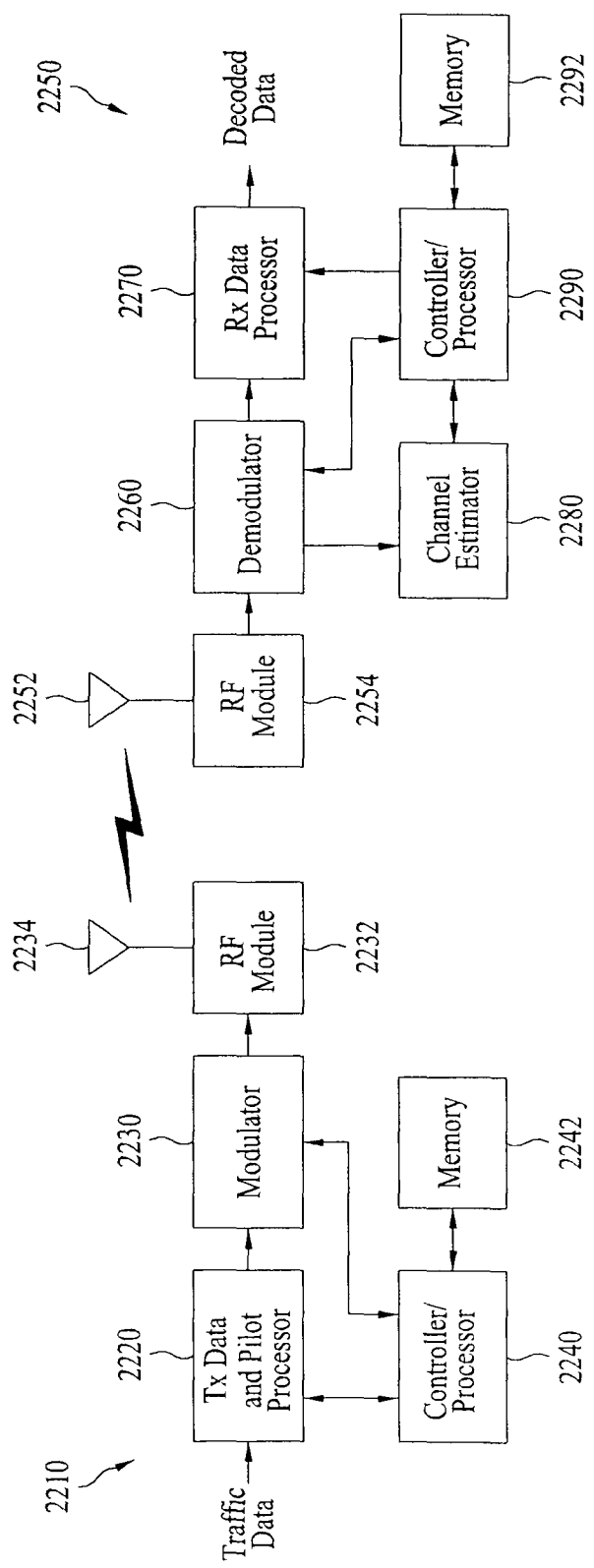
FIG. 22 is a diagram showing a transmitter and receiver applicable to an embodiment of the present invention.

FIG. 22 is a block diagram of a transmitter and a receiver according to an embodiment of the present invention. A transmitter 2210 is part of a BS and a receiver 2250 is part of a UE in a downlink, whereas the transmitter 2210 is part of the UE and the receiver 2250 is part of the BS in an uplink.

Referring to FIG. 22, in the transmitter 2210, a Transmission (Tx) data and pilot processor 2220 generates data symbols by subjecting data (e.g. traffic data and signaling information) to encoding, interleaving, and symbol mapping. The Tx data and pilot processor 2220 also generates pilot symbols and multiplexes the data symbols with the pilot symbols. A modulator 2230 generates transmission symbols according to a radio access scheme. The radio access scheme may be FDMA, TDMA, CDMA, SC-FDMA, MC-FDMA, OFDMA, or a combination of them. An RF module 2232 generates an RF signal by processing the transmission symbols (e.g. digital-to-analog conversion, amplification, filtering, and frequency upconversion) and transmits the RF signal through an antenna 2234.

In the receiver 2250, an antenna 2252 receives a signal from the transmitter 2210 and provides the received signal to an RF module 2254. The RF module 2254 provides input samples to a demodulator 2260 by processing the received signal (e.g., filtering, amplification, frequency downconversion, and analog-to-digital conversion). The demodulator 2260 acquires data values and pilot values by demodulating the input samples. A channel estimator 2280 performs channel estimation using the pilot values received from the demodulator 2260. Also, the demodulator 2260 detects (or equalizes) data from the data values using the channel estimate and outputs data symbol estimates. A Reception (Rx) data processor 2270 symbol-demaps, deinterleaves, and decodes the data symbol estimates. In general, the demodulator 2260 and the Rx data processor 2270 of the receiver 2250 operate complimentarily with the modulator 2230 and the Tx data and pilot processor 2220 of the transmitter 2210, respectively.

Controllers/processors 2240 and 2290 manage and control the operations of various processing modules in the transmitter 2210 and the receiver 2250 so that the transmitter 2210 and the receiver 2250 performs various operations exemplified referring to the descriptions and FIGS. 1 to 22, respectively. Memories 2242 and 2292 store program codes and data used for the transmitter 2210 and the receiver 2250, respectively.

The modules illustrated in FIG. 22 are meant for illustrative purposes. The transmitter and/or the receiver may further include a necessary module, some of the modules/functions of the transmitter and/or the receiver may be omitted, a single module may be separated into different modules, and two or more modules may be incorporated into a single module.

The above-described embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary. In addition, the embodiments may be configured by combining claims which do not have an explicit relationship therebetween or new claims may be added by an amendment after application.

The above-mentioned embodiments of the present invention are disclosed on the basis of a data communication relationship between a base station and a user equipment. Specific operations to be conducted by the base station in the present invention may also be conducted by an upper node of the base station as necessary. In other words, it will be obvious to those skilled in the art that various operations for enabling the base station to communicate with the user equipment in a network composed of several network nodes including the base station will be conducted by the base station or other network nodes other than the base station. The term "Base Station" may be replaced with the terms fixed station, Node-B, eNode-B (eNB), or access point as necessary. The term "User Equipment (UE)" may also be replaced with the term subscriber station (SS) or mobile subscriber station (MSS) as necessary.

The embodiments of the present invention can be implemented by a variety of means, for example, hardware, firmware, software, or a combination thereof. In the case of implementing the present invention by hardware, the present invention can be implemented through application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so as to be driven by a processor. The memory unit may be located inside or outside of the processor, so that it can communicate with the aforementioned processor via a variety of well-known parts.

[Industrial Applicability]

The present invention is applicable to a wireless communication system. More particularly, the present invention is applicable to a method of transmitting a signal in a wireless communication system using a plurality of frequency blocks, and an apparatus thereof.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method of, at a base station, transmitting physical downlink control channel signals in a wireless communication system, the method comprising:
spreading a plurality of signals using a spreading code with a predetermined spreading factor,
multiplexing a plurality of spread signals to construct one or more spread signal groups,
mapping one or more Physical Downlink Control Channels (PDCCHs) to first L Control Channel Elements (CCEs) of N CCEs, wherein each of the one or more PDCCHs carries Downlink Control Information (DCI) and wherein $L \geq 1$ and $N \geq 2$;
mapping one or more Physical Hybrid ARQ Channels (PHICHs) to last M CCEs of the N CCEs, wherein each of the one or more PHICHs carries Hybrid ARQ Acknowledgement (HARQ-ACK) and wherein $M=N-L \geq 1$;
interleaving the N CCEs in units of a Resource Element Group (REG); and
transmitting the one or more PDCCHs and the one or more PHICHs using the interleaved N CCEs, wherein each CCE includes 9 consecutive REGs and each REG includes 4 neighboring available Resource Elements (REs) in an Orthogonal Frequency Division Multiplexing (OFDM) symbol.

2. The method according to claim 1, wherein a number of the last M CCEs is determined as follows:
M=ceil (Na/3) for normal Cyclic Prefix (CP); and
M=ceil (Na/6) for extended Cyclic Prefix (CP), where Na is the number of necessary of PHICH groups.

3. The method according to claim 1, wherein the number of the one or more last CCEs is identified using at least one of bandwidths of component carriers and a combination of component carriers.

4. The method according to claim 1, wherein information on the number of the last M Access is broadcast through a Broadcast Channel (BCH).

5. The method according to claim 1, wherein information on the number of the last M CCEs is signaled using a Radio Resource Control (RRC) message.

6. A method of, at a User Equipment (UE), processing physical downlink control channel signals in a wireless communication system, the method comprising:
receiving one or more Physical Downlink Control Channels (PDCCHs) and one or more Physical Hybrid ARQ Channels (PHICHs) using interleaved N Control Channel Elements (CCEs), wherein each of the one or more PDCCHs carries Downlink Control Information (DCI) and each of the one or more PHICHs carries Hybrid ARQ Acknowledgement (HARQ-ACK);
de-interleaving the N CCEs in units of a Resource Element Group (REG);
de-mapping the one or more PDCCHs from first L CCEs of the N CCEs, wherein $L \geq 1$; and
de-mapping the one or more PHICHs from last M CCEs of the N CCEs, wherein $M=N-L \geq 1$ and wherein each CCE includes 9 consecutive REGs, and each REG includes 4 neighboring available Resource Elements (REs) in an Orthogonal Frequency Division Multiplexing (OFDM) symbol.

7. The method according to claim 6, wherein a number of the last M CCEs is determined as follows:
M=ceil (Na/3) for normal Cyclic Prefix (CP); and
M=ceil (Na/6) for extended Cyclic Prefix (CP), where Na is the number of necessary of PHICH groups.

8. The method according to claim 6, wherein the number of the one or more last CCEs is identified using at least one of bandwidths of component carriers and a combination of component carriers.

9. The method according to claim 6, wherein information on the number of the last M CCEs is broadcast through a Broadcast Channel (BCH).

10. The method according to claim 6, wherein information on the number of the last M CCEs is signaled using a Radio Resource Control (RRC) message.

11. A base station configured for transmitting physical downlink control channel signals in a wireless communication system, the base station comprising:
a Radio Frequency (RF) module; and
a processor, wherein the processor is configured to:
map one or more Physical Downlink Control Channels (PDCCHs) to first L Control Channel Elements (CCEs) of N CCEs, wherein each of the one or more PDCCHs carries Downlink Control Information (DCI), and $L \geq 1$ and $N \geq 2$,
map one or more Physical Hybrid ARQ Channels (PHICHs) to last M CCEs of the N CCEs, wherein each of the one or more PHICHs carries Hybrid ARQ Acknowledgement (HARQ-ACK) and $M=N-L \geq 1$,
interleave the N CCEs in units of a Resource Element Group (REG), and
transmit the one or more PDCCHs and the one or more PHICHs using the interleaved N CCEs, wherein each CCE includes 9 consecutive REGs, and each REG includes 4 neighboring available Resource Elements (REs) in an Orthogonal Frequency Division Multiplexing (OFDM) symbol.

12. The base station according to claim 11, wherein a number of the last M CCEs is determined as follows:
M=ceil (Na/3) for normal Cyclic Prefix (CP); and
M=ceil (Na/6) for extended Cyclic Prefix (CP), where Na is the number of necessary of PHICH groups.

13. The base station according to claim 11, wherein the number of the one or more last CCEs is identified using at least one of bandwidths of component carriers and a combination of component carriers.

14. The base station according to claim 11, wherein information on the number of the last M CCEs is broadcast through a Broadcast Channel (BCH).

15. The base station according to claim 11, wherein information on the number of the last M CCEs is signaled using a Radio Resource Control (RRC) message.

16. User Equipment (UE) configured for processing physical downlink control channel signals in a wireless communication system, the UE comprising:
a Radio Frequency (RF) module; and
a processor, wherein the processor is configured to:
receive one or more Physical Downlink Control Channels (PDCCHs) and one or more Physical Hybrid ARQ Channels (PHICHs) using interleaved N Control Channel Elements (CCEs), wherein each of the one or more PDCCHs carries Downlink Control Information (DCI), each of the one or more PHICHs carries Hybrid ARQ Acknowledgement (HARQ-ACK), de-interleave the N CCEs in units of a Resource Element Group (REG), de-map the one or more PDCCHs from first L CCEs of the N CCEs, wherein L≥1, and de-map the one or more PHICHs from last M CCEs of the N CCEs, wherein M=N−L≥1, and wherein each CCE includes 9 consecutive REGs, and each REG includes 4 neighboring available Resource Elements (REs) in an Orthogonal Frequency Division Multiplexing (OFDM) symbol.

17. The UE according to claim 16, wherein a number of the last M CCEs is determined as follows:

M=ceil (Na/3) for normal Cyclic Prefix (CP); and
M=ceil (Na/6) for extended Cyclic Prefix (CP), where Na is the number of necessary of PHICH groups.

18. The base station according to claim 16, wherein the number of the one or more last CCEs is identified using at least one of bandwidths of component carriers and a combination of component carriers.

19. The UE according to claim 16, wherein information on the number of the last M CCEs is broadcast through a Broadcast Channel (BCH).

20. The UE according to claim 16, wherein information on the number of the last M CCEs is signaled using a Radio Resource Control (RRC) message.

* * * * *